United States Patent
Szyf et al.

(10) Patent No.: US 12,480,164 B2
(45) Date of Patent: Nov. 25, 2025

(54) DNA METHYLATION BIOMARKERS FOR EARLY DETECTION OF CERVICAL CANCER

(71) Applicant: HKG EPITHERAPEUTICS LIMITED, Pierrefonds (CA)

(72) Inventors: Moshe Szyf, Cote St Luc (CA); David Cheishvili, Pierrefonds (CA); Eduardo Franco, Montreal (CA); Mariam El-Zein, Montreal (CA)

(73) Assignee: EpiMedTechGlobal (EMTG), Singapore (SG)

( * ) Notice: Subject to any disclaimer, the term of this patent is extended or adjusted under 35 U.S.C. 154(b) by 88 days.

(21) Appl. No.: 17/299,132

(22) PCT Filed: Feb. 4, 2020

(86) PCT No.: PCT/IB2020/050885
§ 371 (c)(1),
(2) Date: Jun. 2, 2021

(87) PCT Pub. No.: WO2020/115728
PCT Pub. Date: Jun. 11, 2020

(65) Prior Publication Data
US 2022/0073994 A1 Mar. 10, 2022

Related U.S. Application Data

(60) Provisional application No. 62/774,994, filed on Dec. 4, 2018.

(51) Int. Cl.
*C12Q 1/6886* (2018.01)
*G16B 20/20* (2019.01)

(52) U.S. Cl.
CPC ........... *C12Q 1/6886* (2013.01); *G16B 20/20* (2019.02); *C12Q 2600/154* (2013.01)

(58) Field of Classification Search
None
See application file for complete search history.

(56) References Cited

FOREIGN PATENT DOCUMENTS

| | | |
|---|---|---|
| CA | 3055895 | 9/2018 |
| CN | 107541565 | 1/2018 |
| CN | 109680060 | 4/2019 |
| WO | 19977045560 | 12/1997 |
| WO | 2017048932 | 3/2017 |
| WO | 2017143296 | 8/2017 |
| WO | 2017219312 | 12/2017 |
| WO | 2018005668 | 1/2018 |
| WO | 2018009696 | 1/2018 |
| WO | 2018009702 | 1/2018 |
| WO | 2018009703 | 1/2018 |
| WO | 2018009709 | 1/2018 |

OTHER PUBLICATIONS

Farkas (Epigenetics 8:11 1213-1225 2013).*
El-Zein (Int. J. Cancer 147 pp. 1264-1274 Pub Online Jan. 25, 2020).*
NEB catalog (1998/1999 pp. 121, 284).*
Nicolas Wentzensen and al., Utility of Methylation Markers in Cervical Cancer Early Detection: Appraisal of the State-of-the-Science, Gynecol Oncol. Feb. 2009 ; 112(2): 293-299. doi:10.1016/j.ygyno.2008.10.012.
Mariam El-Zein et al., Genome-wide DNA methylation profiling identifies two novel genes in cervical neoplasia, International Journal of Cancer 2020; vol. 147(5) 1264-1274.
Li, Yang, International Search Report and Written Opinion, International PCT Patent Application PCT/IB2019/055855, Feb. 21, 2020.
Stefansson, O. A., Moran, S., Gomez, A., Sayols, S., Arribas-Jorba, C., Sandoval, J., . . . , Esteller, M. (2014), A DNA methylation-based definition of biologically distinct breast cancer subtypes. Mol Oncol. doi:10.1016/j.molonc.2014.10.012.
Aguirre-Ghiso, J. A. (2007). Models, mechanisms and clinical evidence for cancer dormancy, Nat Rev Cancer, (11), 834-846. doi:10.1038/nrc2256.
Xu, R. H., Wei, W., Krawczyk, M., Wang, W., Luo, H., Flagg, K., . . . , Zhang, K. (2017), Circulating tumour DNA methylation markers for diagnosis and prognosis of hepatocellular carcinoma. Nat Mater, 16(11), 1155-1161. doi:10.1038/nmat4997.
Ehrlich, M. (2002). DNA methylation in cancer: too much, but also too little. Oncogene, 21(35), 5400-5413.
Ramzy, II, Omran, D. A., Hamad, O., Shaker, O., & Abboud, A. (2011). Evaluation of serum Line-1 hypomethylation as a prognostic marker for hepatocellular carcinoma. Arab J Gastroenterol, 12(3), 139-142. doi:10.1016/j.ajg.2011.07.002.
Feil R, Charlton J, Bird A P, Walter J, Reik W. Methylation analysis on individual chromosomes: improved protocol for bisulphite genomic sequencing. Nucleic Acids Res. Feb. 25, 1994;22(4):695-6.

(Continued)

*Primary Examiner* — Amanda Haney

(57) ABSTRACT

The present invention discloses an in vitro method for obtaining DNA methylation biomarkers as exquisite DNA methylation positions in the human genome (i.e., CGIDs) that predict cervical cancer especially at as yet inaccessible early stages by examining progression of "categorical" DNA methylation alterations in three stages of premalignant lesions (cervical intraepithelial neoplasia (CIN)), progressing from CIN1 to CIN3. The present invention discloses combinations of CGIDs for detecting with high specificity and sensitivity cervical cancer by measuring their DNA methylation status and deriving a "methylation score", which is useful as a biomarker for cervical cancer. Also disclosed are kits for predicting cervical cancer using such CGIDs using multiplexed next generation sequencing methylation assays, pyrosequencing assays and methylation specific PCR. The DNA methylation markers (CGIDs) described in the present invention are useful for cervical screening and early detection of cervical cancer by any person skilled in the art to detect cervical cancer.

5 Claims, 8 Drawing Sheets
Specification includes a Sequence Listing.

(56) References Cited

OTHER PUBLICATIONS

Grigg G, Clark S. Sequencing 5-methylcytosine residues in genomic DNA, Bioessays, Jun. 1994; 16(6):431-6, 431.

Zhai, R., Zhao, Y., Su, L., Cassidy, L., Liu, G., & Christiani, D. C. (2012), Genome-wide DNA methylation profiling of cell-free serum DNA in esophageal adenocarcinoma and Barrett esophagus. Neoplasia, 14(1), 29-33.

El-Serag, H. B. (2011). Hepatocellular carcinoma. N Engl J Med, 365(12), 1118-1127, doi:10.1056/NEJMra1001683.

Baylin, S. B., Esteller, M., Rountree, M. R., Bachman, K. E., Schuebel, K., & Herman, J.G. (2001). Aberrant patterns of DNA methylation, chromatin formation and gene expression in cancer. Hum Mol Genet, 10(7), 687-692.

Issa, J. P., Vertino, P. M., Wu, J., Sazawal, S., Celano, P., Nelkin, B. D., . . . Baylin, S. B. (1993). Increased cytosine DNA-methyltransferase activity during colon cancer progression. J Natl Cancer Inst, 85(15), 1235-1240.

Valente, S., Liu, Y., Schnekenburger, M., Zwergel, C., Cosconati, S., Gros, C., . . . , Mai, A. (2014). Selective non-nucleoside inhibitors of human DNA methyltransferases active in cancer including in cancer stem cells. J Med Chem, 57(3), 701-713. doi:10.1021/jm4012627.

Warton, K., & Samimi, G. (2015), Methylation of cell-free circulating DNA in the diagnosis of cancer. Front Mol Biosci, 2, 13. doi:10.3389/fmolb.2015.00013.

Dominguez-Vigil, I. G., Moreno-Martinez, A. K., Wang, J. Y., Roehrl, M. H. A., & Barrera-Saldana, H. A. (2018). The dawn of the liquid biopsy in the fight against cancer. Oncotarget, 9(2), 2912-2922. doi:10.18632/oncotarget.23131.

Martin V, Ribieras S, Song-Wang X, Rio M C, Dante R. Genomic sequencing indicates a correlation between DNA hypomethylation in the 5' region of the pS2 gene and its expression in human breast cancer cell lines, Gene, May 19, 1995;157(1-2):261-4.

Radpour, R., Barekati, Z., Kohler, C., Lv, Q., Burki, N., Diesch, C., . . . , Zhong, X. Y. (2011). Hypermethylation of tumor suppressor genes involved in critical regulatory pathways for developing a blood-based test in breast cancer. PLoS One, 6(1), e16080. doi:10.1371/journal.pone.0016080.

Breitbach, S., Tug, S., Helmig, S., Zahn, D., Kubiak, T., Michal, M., . . . , Simon, P. (2014), Direct quantification of cell-free, circulating DNA from unpurified plasma. PLoS One, 9(3), e87838. doi:10.1371/journal.pone.0087838.

Tan, C. H., Low, S. C., & Thng, C. H. (2011), APASL and AASLD Consensus Guidelines on Imaging Diagnosis of Hepatocellular Carcinoma: A Review. Int J Hepatol, 2011, 519783. doi:10.4061/2011/519783.

Luczak, M. W., & Jagodzinski, P. P. (2006), The role of DNA methylation in cancer 25 development. Folia Histochem Cytobiol, 44(3), 143-154.

Zeschnigk M, Schmitz B, Dittrich B, Buiting K, Horsthemke B, Doerfler W. Imprinted segments in the human genome: different DNA methylation patterns in the Prader-Willi/Angelman syndrome region as determined by the genomic sequencing method, Hum Mol Genet. Mar. 1997; 6(3):387-95.

Chan, K. C., Jiang, P., Chan, C. W., Sun, K., Wong, J., Hui, E. P., . . . Lo, Y. M. (2013), Noninvasive detection of cancer-associated genome-wide hypomethylation and copy number aberrations by plasma DNA bisulfite sequencing. Proc Natl Acad 10 Sci U S A, 110(47), 18761-18768. doi:10.1073/pnas.1313995110.

Nishiyama, etc. "Genome-wide DNA methylation profiles in urothelial carcinomas and urothelia at the precancerous stage" Cancer Science, vol. 101, No. 1, Jan. 31, 2010 (Jan. 31, 2010), pp. 231-240.

Flores, A., & Marrero, J. A. (2014). Emerging trends in hepatocellular carcinoma: focus on diagnosis and therapeutics. Clin Med Insights Oncol, 8, 71-76, 20 doi:10.4137/CMO.S9926.

Zhao, Yanhao, International Search Report and Written Opinion, International PCT Patent Application PCT/IB2020/050885, May 6, 2020.

Wina Verlaat et al.; Identification and Validation of a 3-gene methylation classifier for HPV-based cervical screening on self-samples; Mar. 28, 2025. http://aacrjournals.org/clincancerres/article-pdf/doi/10.1158/1078-0432.CCR-17-3615/2117219/1078-0432_ccr-17-3615v1.pdf.

Epigenetics, Sep. 2013, vol. 8, No. 11, pp. 1213-1225, DOI: 10.4161/epi.26346.

Integrative Molecular Medicine, 2017, vol. 4, No. 5, pp. 1-13, DOI: 10.15761/IMM.1000309.

Mariam El-Zein et al., Genome-wide DNA methylation profiling identifies two novel genes in cervical neoplasia, International Journal of Cancer, 2020, pp. 1264-1274, Issue 147, No. 5.

\* cited by examiner

DNA methylation measurements from cervical specimens of premalignant lesions CIN1 to CIN 3 compared to healthy, non-transformed controls using Illumina Beadchip 450K/850K assay or DNA pyrosequencing assay or mass spectometry or PCR based methylation assay and targeted amplification of target CGID, barcoding amplification, and indexed multiplex sequencing

Statistical analysis of DNA methylation measured by methods including Receiver operating characteristics (ROC) assays, hierarchical clustering analysis assays, or neural network analysis

Analysis of progressive DNA methylation alterations (APDMA) method for identifying and obtaining CG positions (CGIDs) with methylation levels characterizing categorically as cervical cancer biomarkers for early prediction, detection and diagnosis of cervical cancer - said CGIDs uniformly hypermethylated in cervical cancer tissue specimens and uniformly unmethylated in healthy, non-transformed normal control cervical tissue and the frequency of these primary methylated CGIDs increases with progression of premalignant stages from CIN1 (infrequent) to CIN3 (pronounced): obtained 79 candidate CGIDs (Table 1, SEQ ID NO: 1 to SEQ ID NO: 79), with average increase in methylation of 10% or decrease of more than 10% transitioning from CIN1 to CIN3

Polygenic DNA methylation biomarker set of 16 CGIDs (Table 2, SEQ ID NOs: 3, 4, 7, 17, 19, 31, 34, 39, 42, 43, 49, 56, 57, 58, 65, 70) hypermethylated between CIN3 and CIN1 and control with highest effect size (Cohen D>1.3) and highest Spearman correlations with progression of CIN phases (r>0.4)

Figure 1

DNA METHYLATION BIOMARKERS FOR EARLY DETECTION OF CERVICAL CANCER

CROSS-REFERENCE TO RELATED APPLICATIONS

This application claims priority under Section 119(e) from U.S. Provisional Application Ser. No. 62/774,994, filed Dec. 4, 2018, entitled "DNA METHYLATION MARKERS FOR EARLY DETECTION OF CERVICAL CANCER" the contents of each which are incorporated herein by reference.

SEQUENCE LISTING

The instant application contains a Sequence Listing which has been submitted electronically in ASCII format and is hereby incorporated by reference in its entirety. Said ASCII copy, created on Jan. 12, 2020, is named TPC53811 Seq List_ST25.txt and is 34,164 bytes in size.

TECHNICAL FIELD

The present invention relates generally to DNA methylation signatures in human DNA, particularly in the field of molecular diagnostics. More specifically, the present invention is DNA methylation biomarkers in the form of a panel, individual as well as combination of polygenic DNA methylation biomarkers for early detection as well as screening of cervical cancer, and their use as a diagnostic kit for early and accurate detection of cervical cancer.

BACKGROUND OF THE INVENTION

Cancer has become a major killer of humans. Early detection of cancer can significantly improve cure rates and reduce the horrific personal and financial cost to the patients, their families and the health care system. At the same time, screening of healthy individuals to assess for pre-cancerous stage biomarker expression and its alterations is useful in a population-wide screening methodology and helpful in identifying risk-prone, cancer susceptible, healthy individuals. Cervical cancer is no exception. Screening can identify cancer at an early stage—before it can cause symptoms. If cervical cancer is caught at its earliest stage, the chance of survival is about 93% and it goes down to 15% for the latest stages https://www.cancer.org/cancer/cervical-cancer/detection-diagnosis-staging/survival.html. Current screening methods include Pap smears, liquid based cytology, HPV testing and visual inspection, however a robust highly accurate and sensitive method for early detection of cervical cancer is lacking.

Biomarkers constitute one of the most important fields in cancer diagnosis. Cancer biomarkers are especially useful for early detection or diagnosis of the disease. Biomarkers can be used to screen patients, for classifying the different stages or grades of cancers and to predict prognosis and resistance to therapy.

The well-established discovery of human papillomavirus (HPV) as the causative agent of cervical neoplasia has revolutionized the prevention and management modalities of this gynecological disease from a secondary (molecular HPV testing) standpoint (1). Knowledge of the HPV genotype is indeed helpful in clinical prediction, as HPVs 16 and/or 18 types are associated with greater risks of lesion progression than other carcinogenic types. However, persistent infection with carcinogenic HPV genotypes is the necessary precursor and driver in cervical carcinogenesis. The latter represents a stepwise progression from premalignant stages (cervical intraepithelial neoplasia, CIN) to invasive cervical cancer. Low-grade CIN (CIN1) is eminently reversible whereas high-grade CIN of grades 2 and 3 (i.e., CIN2 and CIN3, respectively) have a non-negligible risk of progressing to invasion, i.e., cervical cancer. This is particularly true for CIN3.

Managing women with CIN pathologies in the clinic continues to pose a significant dilemma for the gynecologists, as aggressive ablative or excisional treatment may cause immediate complications or increase the risk of miscarriage or premature delivery later in life, when the female patient decides to become pregnant. Recent evidence suggests that epigenetic changes in specific genes may mediate or predict carcinogenic progression. A cancer early detection biomarker can categorically differentiate rare cells with lesions at asymptomatic and precancerous stages due to remarkable changes which include biochemical changes at the epigenetic levels. These epigenetic changes as biomarkers are quite often produced in abnormally large numbers in the cancerous tissues and often preclude manifestation of the disease itself. To identify molecular changes setting-in much before the disease initiation and progression, development of molecular biomarkers is extremely important. One such epigenetic biomarkers DNA methylation levels of certain CpG sites in viral and host genes were shown to increase with the severity of the underlying cervical lesions (2-7).

Among the most-studied and targeted host genes with epigenetic changes associated with cervical cancer and its precursors are cell adhesion molecule 1 (CADM1); death associated protein kinase 1 (DAPK1); myelin and lymphocyte, T cell differentiation protein (MAL); paired box 1 (PAX1); telomerase reverse transcriptase (TERT); erythrocyte membrane protein band 4.1-like 3 (EPB41L3), Ras association domain family member 1 (RASSF1); SRY-box 1 (SOX1); cadherin 1 (CDH1); LIM homeobox transcription factor 1 alpha (LMX); cyclin A1 (CCNA1); family with sequence similarity 19 member A4, C-C motif chemokine-like (FAM19A4); and retinoic acid receptor beta (RARβ)8. Single (9) methylation markers were investigated in addition to those that included two (i.e., CADM1 and MAL(3,4,10); MAL and miR124-2 (11-14), three (i.e., CADM1, MAL, and miR124-2) (13,15), four (i.e., JAM3, EPB41L3, TERT, and C13ORF18) (16,17), and five (i.e., PAX1, DAPK1, RARB, WIF1, and SLIT2) (14) marker panels as well as panels involving various combinations of SOX1, PAX1, LMX1A and NKX6-1 markers to attain sufficiently high sensitivities for advanced lesions (18).

However, only one previous study, using a genome-wide methylation approach identified three methylation panels (JAM3/ANKRD18CP, C13ORF18/JAM3/ANKRD18CP, and JAM3/GFRA1/ANKRD18CP) with the highest combined diagnostic accuracy for the detection of CIN2+ in cervical samples; and the sensitivities were reported to be 72%, 74% and 73%, respectively, with corresponding specificities of 79%, 76% and 77% (2). Accordingly, there is a need for improved methods of identification of DNA methylation biomarkers, panel of DNA methylation biomarkers associated with early detection and risk prediction of cervical cancer as well as kits based on such biomarkers for population-wide screening of apparently healthy women for early detection and susceptibility for cervical cancer and for risk assessments of women with pre-cancerous pathologies.

The present invention provides a solution to the problem associated with lack of early detection markers of cervical cancer by using DNA methylation biomarkers as singular, combination as well as panel-based biomarkers, since there lacks a single or combined methylation marker that has the appropriate diagnostic performance for risk prediction of cervical cancer at an early stage at present. The present invention discloses a method for obtaining early biomarkers of progression of premalignant lesion to cervical cancer that could be used for general screening in non-symptomatic as well as women displaying the CIN1 to CIN3 pathologies.

OBJECTIVES OF THE INVENTION

The main objective of the present invention relates to biomarkers for early detection and diagnosis of human cervical cancer.

Further objective of the present invention relates to an in vitro method disclosed herein called "analysis of progressive DNA methylation alterations (APDMA)" that involves steps of examining genome wide profiles of DNA methylation of specimens from women with different CIN grade pathologies (CIN1 to CIN3) as compared to healthy control specimens from women for obtaining CGIDs as DNA methylation biomarkers that predict when combined, using a linear regression model disclosed here, cervical cancer with >95% sensitivity and specificity in publicly available methylation profiles of cervical cancer.

Another objective of the present invention relates to molecular biomarkers as indicators of population-wide screening of women for early detection of cervical cancer as well as for risk assessments of women with CIN1 to CIN3 pathologies.

Yet another objective of the present invention relates to a chip/array useful for early detection and diagnosis of cervical cancer.

Still another objective of the present invention is to provide a cheaper, accurate, robust, highly sensitive and specific, and high throughput diagnostic kit for accurate early diagnosis of human cervical cancer usable by any person skilled in the art.

SUMMARY OF THE INVENTION

Accordingly, the present invention provides methods and materials useful to examine DNA methylation alterations and relates to DNA methylation CGID biomarkers for early detection and diagnosis of human cervical cancer, wherein the progression of premalignant cervical lesions (cervical intraepithelial neoplasia, CIN grades 1 to 3) correlates with increased frequency of DNA methylation at CG positions in the human genome in the form of Illumina probe ID or DNA methylation number or CG identifiers (CGIDs) which are obtained using the presently disclosed in vitro method of "analysis of progressive DNA methylation alterations" (APDMA) as disclosed herein. As discussed in detail below, typically these biomarkers are based on variables that lend themselves to predicting risk of women with CIN1 to CIN3 pathologies as well as in population-wide screens for developing cervical cancer, and in turn useful as early detection and diagnosis biomarkers. The present disclosure provides that the said CGID biomarker positions are almost uniformly methylated in cervical cancer and almost uniformly unmethylated in normal cervical specimens. The present invention thus, discloses the said set of "categorically" distinct DNA methylation profiles that create a binary differentiation between cervical cancer and nonmalignant tissues in the form of DNA methylation at these CGID sites, whereby these sites are only methylated in cervical cancer and fully unmethylated in nonmalignant tissue. Moreover, as disclosed herein these biomarker sites show an increasing frequency of DNA methylation with the progression of premalignant cervical lesions going from CIN1 to CIN3. Thus, the present invention provides an early detection and diagnosis in vitro method using targeted amplification of the said CGID biomarkers and deep next generation bisulfite sequencing to detect even a few molecules of cervical cancer cells or even the cells from premalignant lesions on the trajectory to becoming cervical cancer on the background of mostly normal cervical cell profile. The present invention is thus useful for as yet inaccessible early detection of cervical cancer cells on a high background of nonmalignant tissue particularly using cervical specimens such as pap smears as an easy and user-friendly method of early detection usable by any person of skill in the art.

An embodiment of the present invention relates to an in vitro method for obtaining highly predictive sites for cervical cancer for early detection even at the asymptomatic and premalignant stages called the "analysis of progressive DNA methylation alterations (APDMA) method" using different sources of genome wide DNA methylation data derived by next generation sequencing, including, MeDIP arrays, MeDIP sequencing etc., obtained in the form of DNA methylation CGID biomarker signatures. The present invention provides a combination of "categorical" CGID biomarkers for detection of cervical cancer in a discovery set of genome wide data from specimens of progressive premalignant lesions going from CIN1 to CIN3.

Previous analyses before the present invention using classic "case-control" design and logistic regressions had revealed DNA methylation CGID biomarkers that detect cancer at lower sensitivity and specificity. Thus, another embodiment of the present invention relates to a computer-implemented method for obtaining candidate DNA methylation biomarkers for early detection for cervical cancer diagnosis, termed the APDMA method which reveals the earliest methylation profiles of cancer that are primary and essential for the cancer state and are thus present in all cervical cancer specimens tested in the disclosure herein.

An embodiment of the present invention discloses an in vitro method that accurately detects cervical cancer by measuring DNA methylation in a polygenic set of CGID biomarkers in hundreds of people concurrently, by sequential amplification with target specific primers followed by barcoding primers and multiplexed sequencing in a single next generation Miseq sequencing reaction, data extraction and quantification of methylation.

An embodiment of the present invention discloses an in vitro method of measurement of methylation of said DNA methylation CGID biomarkers using pyrosequencing assays or methylation specific PCR. The present invention discloses the calculation of a polygenic weighted methylation score that predicts cervical cancer.

An embodiment of the present invention discloses a panel of DNA methylation biomarkers for screening, diagnosis, early detection and prediction of cervical cancer in a sample of DNA isolated from a specimen from a woman including women with no other clinical evidence for cervical cancer from cervical specimens.

An embodiment of the present invention discloses a panel of DNA methylation biomarkers in form of a chip for screening, diagnosis, early detection and prediction of cervical cancer in a sample of DNA isolated from a specimen from a woman including women with no other clinical evidence for cervical cancer from cervical specimens.

An embodiment of the present invention discloses an in vitro non-invasive method using the panel of DNA methylation biomarkers for screening, diagnosis, early detection and prediction of cervical cancer in a sample of DNA isolated from a specimen from a woman including women with no other clinical evidence for cervical cancer from cervical specimens.

An embodiment of the present invention discloses a use of the DNA methylation biomarkers as disclosed herein for screening, diagnosis, early detection and prediction of cervical cancer in a sample of DNA isolated from a specimen from a woman including women with no other clinical evidence for cervical cancer from cervical specimens.

The present invention provides with robust DNA methylation biomarkers identified using CGID positions in the human genome that provide a highly accurate, specific and sensitive assessment of risk that can guide early intervention and treatment of cervical cancer even in women at asymptomatic and precancerous stages. The present invention provides an easy yet efficient method that could be used by any person skilled in the art to detect cervical cancer. The present invention relates to the use of the disclosed DNA methylation CGID biomarkers described herein for population-wide screening of healthy women for cervical cancer as well as for monitoring and assessing cancer risk in women with HPV infection and CIN premalignant lesions. The present invention demonstrates the utility of the disclosed DNA methylation biomarkers in detecting cervical cancer in CIN samples using a polygenic score based on the DNA methylation measurement methods disclosed herein. The present invention also discloses the utility of the disclosed method for obtaining "polygenic" categorical DNA methylation CGID biomarkers for cervical cancer using any method available to people skilled in the art for genome wide bisulfite sequencing such as next generation bisulfite sequencing, MeDip sequencing, ion torrent sequencing, Illumina 450 K arrays and Epic microarrays etc., followed by the presently disclosed APDMA method as disclosed herein, for discovering specific and sensitive markers useful for early and very early detection of cervical cancer because of their categorical difference in DNA methylation profile between healthy controls and cervical cancer specimens with a gradation of increasing frequency when progressing from specimens from CIN1 to CIN3 precancerous stages.

Other objects, features and advantages of the present invention will become apparent to those skilled in the art from the following detailed description. It is to be understood, however, that the detailed description and specific examples, while indicating some embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

FIG. 1. Roadmap for developing analysis of progressive DNA methylation alterations (APDMA) method for obtaining the early detection DNA methylation biomarkers. The roadmap depicts the analytical procedure for developing the APDMA method based on the DNA methylation profile using Illumina assay probe identification (CGID) which categorically differentiate the normal profile in the cervical specimens from the DNA methylation profile in the cervical cancer specimens for obtaining "categorical" DNA methylation CGID biomarkers for early detection, diagnosis as well as screening for cervical cancer. In step 1, DNA methylation measurements are obtained from cervical specimens of premalignant lesions CIN1 to CIN3 stages compared to healthy control specimens, said DNA methylation measurements are obtained either by performing Illumina Beadchip 450K or 850K assay of DNA extracted from the specimens or by performing DNA pyrosequencing of DNA extracted from sample or by mass spectrometry based (Epityper™), or by PCR based methylation assays and targeted amplification of a region spanning the target CGIDs disclosed here from bisulfite converted DNA followed by barcoding in a second set of amplification and indexed multiplexed sequencing on an Illumina next generation sequencer. In step 2, statistical analysis method is performed on the DNA methylation measurements of step 1, wherein the statistical analysis includes Receiver operating characteristics (ROC) assays, hierarchical clustering analysis assays, or neural network analysis. In step 3, the presently developed and disclosed "analysis of progressive DNA methylation alterations" (APDMA) method is performed to identify CGID positions whose methylation levels are an early predictor or biomarker of cervical cancer. In step 4, the present disclosure further narrows and shortlists the polygenic DNA methylation CGID combinations as a biomarker set of 16 CGIDs. The method allows for obtaining "categorical" rather than quantitative differences in methylation profiles between normal and cervical cancer cells that in turn allows for early detection because of the characteristic switch in DNA methylation profile at the select CGIDs that provide as the DNA methylation biomarkers for early detection, diagnosis and screening for cervical cancer. These serve as a panel of candidate CGID biomarkers for early detection of cervical cancer in women, particularly those who are asymptomatic or with premalignant lesions.

DETAIL DESCRIPTIONS OF THE INVENTION

Figure 2:
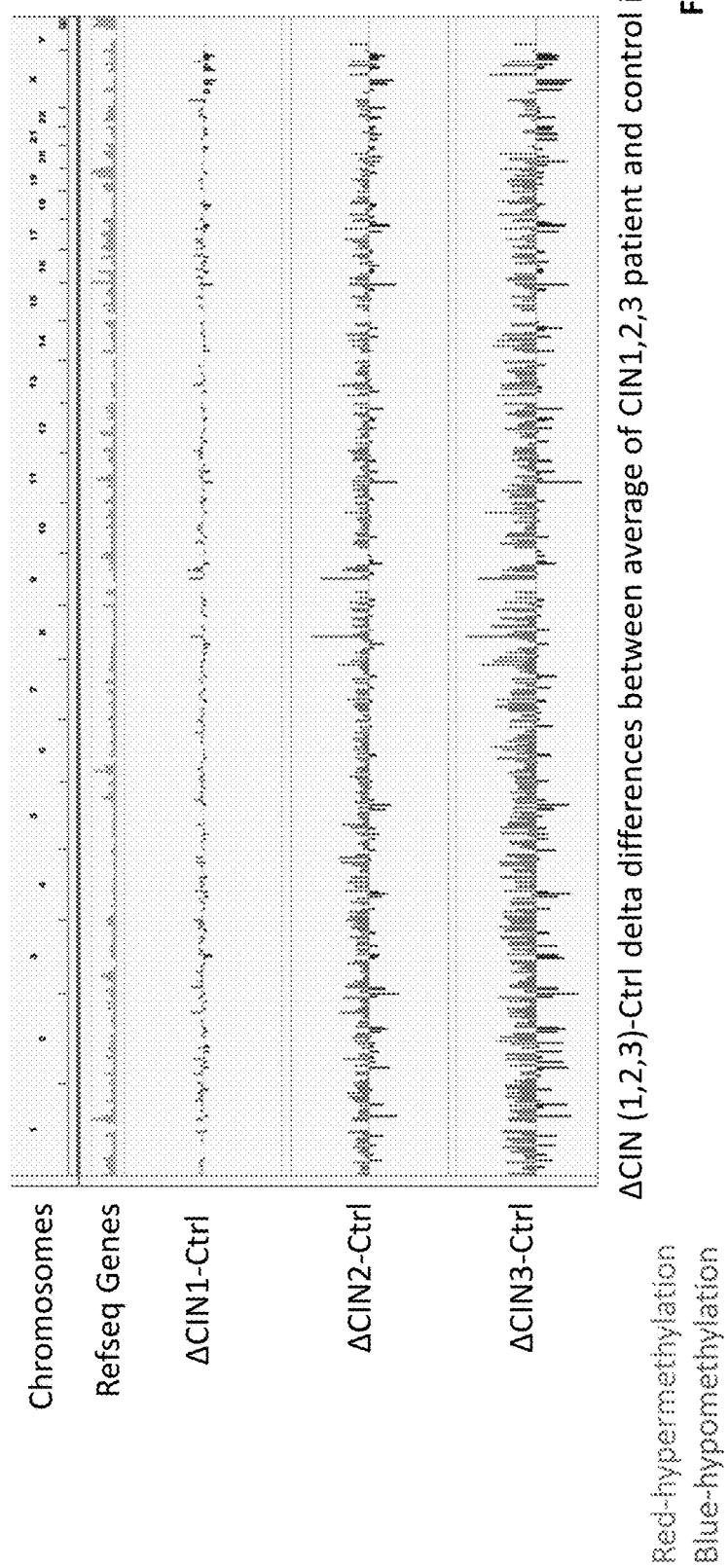
FIG. 2. Method to obtain sites whose frequency of methylation increases progressively through premalignant CIN stages. DNA prepared from cervical specimens from specimens from CIN1, CIN2, and CIN3 histology individuals; and non-transformed, healthy controls was subjected to genome wide DNA methylation analysis on Illumina Epic Arrays. The level of methylation of 7715 CGIDs correlated significantly (q>0.05) with progression of premalignant CIN stages from CIN1 to CIN3. A. IGV browser view of the difference in methylation of these sites from control cervical specimens across the genome. Top track shows positions of chromosomes. Second track shows the position of Refseq genes across the genome. The following tracks (ΔCIN1-Ctrl, ΔCIN2-Ctrl, ΔCIN3-Ctrl) show the difference in average methylation between each of the CIN stages and controls. Progressive hypermethylation through the stages is observed.

In the description of embodiments, reference may be made to the accompanying figures which form a part hereof, and in which is shown by way of illustration a specific embodiment in which the invention may be practiced. It is to be understood that other embodiments may be utilized and structural changes may be made without departing from the scope of the present invention. Many of the techniques and procedures described or referenced herein are well understood and commonly employed by those skilled in the art. Unless otherwise defined, all terms of art, notations and other scientific terms or terminology used herein are intended to have the meanings commonly understood by those of skill in the art to which this invention pertains. In some cases, terms with commonly understood meanings are defined herein for clarity and/or for ready reference, and the inclusion of such definitions herein should not necessarily be construed to represent a substantial difference over what is generally understood in the art.

All illustrations of the drawings are for the purpose of describing selected versions of the present invention and are not intended to limit the scope of the present invention.

All publications mentioned herein are incorporated herein by reference to disclose and describe aspects, methods and/or materials in connection with the cited publications.

DNA methylation refers to chemical modifications of the DNA molecule. Technological platforms such as the Illumina Infinium microarray or DNA sequencing-based methods have been found to lead to highly robust and reproducible measurements of the DNA methylation levels of a person. There are more than 28 million CpG loci in the human genome. Consequently, certain loci are given unique identifiers such as those found in the Illumina CpG loci database (see, e.g. Technical Note: Epigenetics, CpG Loci Identification ILLUMINA Inc. 2010). These CG locus designation identifiers are used herein.

Definitions

As used herein, the term "CG" refers to a di-nucleotide sequence in DNA containing cytosine and guanosine bases. These di-nucleotide sequences could become methylated in the DNA from humans as well as other animals. The CGID reveals its position in the human genome as defined by the Illumina 450K manifest or Illumina EPIC manifest (the annotation of the CGs listed herein is publicly available at https://bioconductor.org/packages/release/data/annotation/html/IlluminaHumanMethylation450k.db.html or https://bioconductor.org/packages/release/data/annotation/html/IlluminaHumanMethylationEPICmanifest.html and installed as an R package IlluminaHumanMethylation450k.db (R package version 2.0.9.) or IlluminaHumanMethylationEPICmanifest (R package version 0.3.0).

As used herein, the term "beta-value" refers to computation of methylation level at a CGID position derived by normalization and quantification of Illumina 450K or EPIC arrays using the ratio of intensities between methylated and unmethylated probes and the formula: beta value=methylated C intensity/(methylated C intensity+unmethylated C intensity) between 0 and 1 with 0 being fully unmethylated and 1 being fully methylated.

As used herein, the term "penalized regression" refers to a statistical method aimed at identifying the smallest number of predictors required to predict an outcome out of a larger list of biomarkers as implemented for example in the R statistical package "penalized" as described in Goeman, J. J., L1 penalized estimation in the Cox proportional hazards model. Biometrical Journal 52(1), 70-84.

As used herein, the term "clustering" refers to the grouping of a set of objects in such a way that objects in the same group (called a cluster) are more similar (in some sense or another) to each other than to those in other groups (clusters).

As used herein, the term "Hierarchical clustering" refers to a statistical method that builds a hierarchy of "clusters" based on how similar (close) or dissimilar (distant) are the clusters from each other as described for example in Kaufman, L.; Rousseeuw, P. J. (1990). *Finding Groups in Data: An Introduction to Cluster Analysis* (1 ed.). New York: John Wiley. ISBN 0-471-87876-6.

As used herein, the term "Receiver operating characteristics (ROC) assay" refers to a statistical method that creates a graphical plot that illustrates the performance of a predictor. The true positive rate of prediction is plotted against the false positive rate at various threshold settings for the predictor (i.e. different % of methylation) as described for example in Hanley, James A.; McNeil, Barbara J. (1982). "The Meaning and Use of the Area under a Receiver Operating Characteristic (ROC) Curve". Radiology 143 (1): 29-36.

As used herein, the term "multivariable or polygenic linear regression" refers to a statistical method that estimates the relationship between multiple "independent variables" or "predictors" such as percentage of methylation in multiple CGIDs, and a "dependent variable" such as cancer. This method determines the "weight" or coefficient of each CGIDs in predicting the "outcome" (dependent variable such as cancer) when several "independent variables" such as CGIDs are included in the model.

As used herein, the term "epigenetic" means relating to, being, or involving a chemical modification of the DNA molecule. Epigenetic factors include the addition or removal of a methyl group which results in changes of the DNA methylation levels. Novel molecular biomarkers of early detection or diagnosis or prediction of cervical cancer that observe methylation patterns in genomic DNA, such as those disclosed here as CGID based biomarkers allow one to prognosticate cervical cancer risk and susceptibility even at very early stages where the women are asymptomatic or at premalignant stages progressing from CIN1 to CIN3, and would be useful in the clinic, to epidemiologists, medical professionals, and are the present disclosure is made such that it be accessible and usable by any person skilled in the art. Exclusively clinical biomarkers such as pap smears, histological identification have a long and successful history in cervical cancer diagnosis however, they are marred by vast degrees of variability and being incapable for use in early detection of cervical cancer. By contrast, molecular biomarkers such as epigenetic markers in form of DNA methylation biomarkers have as yet been rarely used.

As used herein, the term "DNA methylation biomarker" refers to a CpG position that is potentially methylated. Methylation typically occurs in a CpG containing nucleic acid. The CpG containing nucleic acid may be present in, e.g., in a CpG island, a CpG doublet, a promoter, an intron, or an exon of gene. For instance, in the genetic regions provided herein the potential methylation sites encompass the promoter/enhancer regions of the indicated genes. Thus, the regions can begin upstream of a gene promoter and extend downstream into the transcribed region.

The presently disclosed method posits that the frequency of cells that display a cervical cancer DNA methylation profile increases with the progression from CIN1 to CIN3 pathologies and that these methylation profiles are characteristic of earliest cervical cancer. Second, since cells that convert to cancer are rare in early premalignancy, the DNA methylation profile should be categorically different than the normal profile of cervical cells so as to be detected on a background of mostly nonmalignant cells at the earliest of stages. Third, these DNA methylation profiles should be present in all fully developed cervical cancer specimens if they are primary and critical characteristic of cervical cancer. Considering the aforementioned three prerequisites, the presently disclosed an in vitro method termed "analysis of progressive DNA methylation alterations (APDMA)" involves steps of examining genome wide profiles of DNA methylation of specimens isolated and obtained from women with different CIN grade pathologies (CIN1 to CIN3) compared with healthy, non-transformed, healthy control cervical specimens after well-characterized HPV genotyping, using Infinium Methylation EPIC arrays. The present invention discloses an in vitro method for obtaining Illumina probe ID or DNA methylation number or CG identifiers (CGIDs) as DNA methylation biomarkers that predict when combined, using a linear regression model disclosed here, cervical cancer with >95% sensitivity and specificity in publicly available methylation profiles of cervical cancer. The present invention also provides a panel of DNA methylation biomarkers for screening and early detection of cervical cancer, wherein the panel comprises of CGIDs having sequences selected from the group consisting of SEQ ID NO: 1 to 79 as listed in Table 1 as well as shortlisted subsets thereof as listed in Table 2 and Table 3, respectively, as disclosed herein. The present invention further provides with two CGIDs as minimally sufficient to detect cervical cancer in publicly available DNA methylation data with sensitivity and specificity that approaches 1. The present invention also discloses kits for in vitro measuring the DNA methylation biomarkers as the DNA methylation levels of the disclosed CGIDs in DNA isolated from cervical specimens to be used for population-wide screening of women for early detection of cervical cancer as well as for risk assessments of women with CIN1 to CIN3 pathologies.

The invention disclosed herein has a number of embodiments. In an embodiment, the present invention provides polygenic DNA methylation CGID biomarkers of cervical cancer in cervical smears for early detection of cervical cancer, said polygenic DNA methylation biomarkers panel is derived using "analysis of progressive DNA methylation alterations (APDMA) method" disclosed in the present invention on genome wide DNA methylation derived by mapping methods, such as Illumina 450K or 850K arrays, genome wide bisulfite sequencing using a variety of next generation sequencing platforms, methylated DNA Immunoprecipitation (MeDIP) sequencing or hybridization with oligonucleotide arrays.

In an embodiment, the present invention provides the method for obtaining DNA methylation biomarkers for detecting cervical cancer, comprising the step of performing statistical analysis and the "analysis of progressive DNA methylation alterations (APDMA)" method disclosed in the present invention on DNA methylation measurements obtained from cervical specimens of premalignant lesions CIN1 to CIN3.

In an embodiment, the presently disclosed method comprises of performing statistical analysis and the "analysis of progressive DNA methylation alterations (APDMA)" method on DNA methylation measurements obtained from cervical specimens, said DNA methylation measurements are obtained by performing Illumina Beadchip 450K or 850K assay of the DNA extracted from the specimens. In another embodiment, said DNA methylation measurements are obtained by performing DNA pyrosequencing of DNA extracted from sample or by mass spectrometry based (Epityper™), or by PCR based methylation assays and targeted amplification of a region spanning the target CGIDs disclosed here from bisulfite converted DNA followed by barcoding in a second set of amplification and indexed multiplexed sequencing on an Illumina next generation sequencer. In a further embodiment, said statistical analysis includes Receiver operating characteristics (ROC) assays. In yet another embodiment, said statistical analysis includes hierarchical clustering analysis assays. In an additional embodiment, said statistical analysis includes neural network analysis.

In an embodiment of the present invention, it discloses an in-vitro method for obtaining early predictors of cervical cancer, the method comprising the steps of: (a) measuring DNA methylation from a cervical specimen sample, (b) performing statistical analysis on the DNA methylation measurement obtained in step a, (c) determining DNA methylation status of a multitude of independent genomic CG positions called CG identifiers (CGIDs) by performing analysis of progressive DNA methylation alterations (APDMA) of genome wide DNA methylation profiles obtained in step b, (d) classifying CGIDs based on frequency of their DNA methylation correlating with cervical cancer premalignant stage progression, (e) obtaining candidate CGIDs from classification in step d to obtain early predictors of cervical cancer as DNA methylation biomarkers.

In another embodiment of the present invention, it discloses an in-vitro method for obtaining early predictors of cervical cancer, the method comprising the steps of: (a) measuring DNA methylation from a cervical specimen sample, (b) performing statistical analysis on the DNA methylation measurement obtained in step a, (c) determining DNA methylation status of a multitude of independent genomic CG positions called CG identifiers (CGIDs) by performing analysis of progressive DNA methylation alterations (APDMA) of genome wide DNA methylation profiles obtained in step b, (d) classifying CGIDs based on frequency of their DNA methylation correlating with cervical cancer premalignant stage progression, (e) obtaining candidate CGIDs from classification in step d to obtain early predictors of cervical cancer as DNA methylation biomarkers, wherein said measuring DNA methylation is performed using methods comprising, Illumina 27K, 450K or 850K arrays, genome wide bisulfite sequencing on platforms including, HiSeq, MiniSeq, MiSeq or NextSeq sequencers, torrent sequencing, methylated DNA Immunoprecipitation (MeDIP) sequencing, hybridization with oligonucleotide arrays, DNA pyrosequencing, mass spectrometry based (Epityper™) or PCR based methylation assays.

In yet another embodiment of the present invention, it discloses an in-vitro method for obtaining early predictors of cervical cancer, the method comprising the steps of: (a) measuring DNA methylation from a cervical specimen sample, (b) performing statistical analysis on the DNA methylation measurement obtained in step a, (c) determining DNA methylation status of a multitude of independent genomic CG positions called CG identifiers (CGIDs) by performing analysis of progressive DNA methylation alterations (APDMA) of genome wide DNA methylation profiles obtained in step b, (d) classifying CGIDs based on frequency of their DNA methylation correlating with cervical cancer premalignant stage progression, (e) obtaining candidate CGIDs from classification in step d to obtain early predictors of cervical cancer as DNA methylation biomarkers, wherein said statistical analysis on the DNA methylation measurement includes Pearson correlation, Receiver operating characteristics (ROC) assays, and hierarchical clustering analysis.

In a further embodiment of the present invention, it discloses an in-vitro method for obtaining early predictors of cervical cancer, the method comprising the steps of: (a) measuring DNA methylation from a cervical specimen sample, (b) performing statistical analysis on the DNA methylation measurement obtained in step a, (c) determining DNA methylation status of a multitude of independent genomic CG positions called CG identifiers (CGIDs) by performing analysis of progressive DNA methylation alterations (APDMA) of genome wide DNA methylation profiles obtained in step b, (d) classifying CGIDs based on frequency of their DNA methylation correlating with cervical cancer premalignant stage progression, (e) obtaining candidate CGIDs from classification in step d to obtain early predictors of cervical cancer as DNA methylation biomarkers, wherein said cervical cancer premalignant stage progression comprises cervical intraepithelial neoplasia lesions at stages CIN1, CIN2 and CIN3.

In an alternate embodiment of the present invention, it discloses an in-vitro method for obtaining early predictors of cervical cancer, the method comprising the steps of: (a) measuring DNA methylation from a cervical specimen sample, (b) performing statistical analysis on the DNA methylation measurement obtained in step a, (c) determining DNA methylation status of a multitude of independent genomic CG positions called CG identifiers (CGIDs) by performing analysis of progressive DNA methylation alterations (APDMA) of genome wide DNA methylation profiles obtained in step b, (d) classifying CGIDs based on frequency of their DNA methylation correlating with cervical cancer premalignant stage progression, (e) obtaining candidate CGIDs from classification in step d to obtain early predictors of cervical cancer as DNA methylation biomarkers, wherein said CGIDs based on frequency of their DNA methylation correlating with cervical cancer premalignant stage progression are selected from a group of CGIDs as set forth in SEQ ID NO: 1 to SEQ ID NO: 79. In a supplemental embodiment of the present invention, the 79 CGID sites are useful alone or in combination as early predictors of cervical cancer are delineated as DNA methylation biomarkers for early detection of cervical cancer.

Table 1: Selected 79 Polynucleotides Having CG Methylation Sites (CGIDs) Useful in Embodiments of the Present Invention.

The 79 CGID biomarkers discussed herein are found in Table 1 that is included with this application. The said biomarkers were shortlisted as progressively methylated CGIDs with an average increase in methylation of 10% or decrease of more than 10% during transition from CIN1 to CIN3 stages and with a background methylation in normal cells (less than 10%) using the assumptions of the APDMA method as disclosed herein. The Illumina method takes advantage of sequences flanking a CG locus to generate a unique CG locus cluster ID with a similar strategy as NCBI's refSNP IDs (rs #) in dbSNP.

| SEQ ID NO | Probe | Probe with CpG marked |
|---|---|---|
| SEQ ID NO: 1 | cg08272731 | GAAGGAGGCTGCGCGCCAGCCCGCCCGCGGCGCCC GGGCTCAGGCGCCGTGACGGCTGCA[CG]CGCTGCCC CGCACTCTGAGGGCCTTCATTAGCTCGCTCCCCGCG CCGAGGCTGGGCGGG |
| SEQ ID NO: 2 | cg19598567 | CCTCCCGCAGCTCATTGCAGCCCCGAGGAAATCACC GGGGGAGGGCTCGGGAGTGCGGCG[CG]GCAGCCCC ATAATTTCCAGGGCCCTTCTCCTACACTGACACGTA ATTGTCAGATTGTTTT |

-continued

| SEQ ID NO | Probe | Probe with CpG marked |
|---|---|---|
| SEQ ID NO: 3 | cg13944175 | CCGCCGCGGGTTCCCAGGGCTGGTGGTAGTTGCCGT CCCACACGTACGTGGCGGGGTCCT[CG]TCAGCGAAG ACCTCGCGGAACATGTCGACCATGTAGAGGTCCTCG GCGCGGTTGCCATCC |
| SEQ ID NO: 4 | cg19717586 | GGGGAGGAATATTAGACTCGGAGGAGTCTGCGCGCT TTTCTCCTCCCCGCGCCTCCCGGT[CG]CCGCGGGTTC ACCGCTCAGTCCCCGCGCTCGCTCCGCACCCCACCC ACTTCCTGTGCTCG |
| SEQ ID NO: 5 | cg22721334 | CAGGCCGGTCCCAGCCGCCCGGAGCCCCAGTGCGCG ATGGCGGCCGGCAAACTGCGCCTG[CG]CACTGGGCC TCACCGCGGACTACGACTCCCACAATGCCGCGAGGC TGTGCCGCGCACCGG |
| SEQ ID NO: 6 | cg13985485 | GTGACGCGCGGCCGCAGCTGCCCGCGGGCGGAGCG CTCTCAGACCCCGGAGCGCACACCG[CG]GGGCCATC GGTGCCATCGCGGATCTCCAGGCTCCTCATCAGTCC GCCGGGGCCGCAGCAG |
| SEQ ID NO: 7 | cg11358689 | GAGGAATATTAGACTCGGAGGAGTCTGCGCGCTTTT CTCCTCCCCGCGCCTCCCGGTCGC[CG]CGGGTTCACC GCTCAGTCCCCGCGCTCGCTCCGCACCCCACCCACTT CCTGTGCTCGCCC |
| SEQ ID NO: 8 | cg01944624 | ATCTACCGTCTCCAATCTCCATCTCCGAAGTTATGCC CACTTCCTCGAAGTTTGGAGCCA[CG]CGAACTACAC TGCCCAGAAGGCGCCGCGCCGTGAGCCGCGATGCTT GGCCAATGAAAAGA |
| SEQ ID NO: 9 | cg04864807 | GGGAGGGCTCGTGAGAGCCAATGAGAGCGCGGAAG GCGGCGAGCGAGCCAATGGACGCGG[CG]GTGGGGC AGGGGGCGGGGCCTGGGCGAGGCCGGGGGCGGAAT GGGCTGAGTGCCCTGTCT |
| SEQ ID NO: 10 | cg13849378 | CGGCAAGCGGAGCAGCGAGGCAGGGTAGCTTCATC ACACTCGCGGCGGATGCGGATTCCG[CG]CCGCCCCG GCTCTAGCTGCTCAGGCGACCGCCACCCTCGCCTCG CCGCCGCCCGTGCACA |
| SEQ ID NO: 11 | cg19274890 | GCGGACGGCGGCTCCATCCGCGGCAATCACCGTAGT GCTTGTTTGTGGAAGCCGAGCGTG[CG]TGCGCCGCG CGCGCACCCAGTCCAGCGCGGAGTGGGCGTCTACCC GAGGAGGGGTGTCTG |
| SEQ ID NO: 12 | cg06783737 | TGGGGAATTAGCTCAGGCGGTGGAGCGCTCGCTTAG CTATGCGAGAGGTAGCGAGATCGA[CG]CCCGCATTC TCCAGTTTCTTGTCTGGTTTATGTCTCTTAGTTTGTAT TCCCCGTTGTTTC |
| SEQ ID NO: 13 | cg19429281 | GAAGTCCCAGGGACCTGCGGAGCGCAGACATAACA CAACACAGAGCAAAACTCACCGCTG[CG]GTGACTTT CACTCCACGCGATCCGCTTCCCGGTTTACGCTAAACT GGGCGCTCGGGACAG |
| SEQ ID NO: 14 | cg00064733 | GGCTGCGGACGGCGGCTCCATCCGCGGCAATCACCG TAGTGCTTGTTTGTGGAAGCCGAG[CG]TGCGTGCGC CGCGCGCGCACCCAGTCCAGCGCGGAGTGGGCGTCT ACCCGAGGAGGGGTG |
| SEQ ID NO: 15 | cg25258740 | CCCCCGCCGGCCGCCGGCCGCGCTCCCCGCCTTCAT TCTGTGATCTGCGGATTTGCCAGT[CG]CCAACCTCCG CGCCCAGAGTCACCATCGCGCAGGGTTGGGCAAACC ATGGAGCTCGGGGC |
| SEQ ID NO: 16 | cg08087594 | AACTCCTGCACAAATCATTTCAAACGCGGTCGGCTT CTAATCGGGAAGTAATCTCAGTGA[CG]CTGGCGGTG CAGAGAACCGAGTCTGGACGCACACACACAAACAC ACCGCGGGCCTCCGCA |
| SEQ ID NO: 17 | cg17233763 | GTGTGCTCAGCCTCAGCGTGAGGGGCACCTGCTCGT CTGGGCTCACAGCGAAGGCAGCCT[CG]CCGCGAGCT GCCGCTGCCGCTGCTGCCGCCACTGGTGTTGCCGCT CTCAGGCGCCAGGCT |

-continued

| SEQ ID NO | Probe | Probe with CpG marked |
|---|---|---|
| SEQ ID NO: 18 | cg11372636 | GCCGGGAGCCTGACGTCACCACGCCCTGCCTGTCAA TCTGCAGCGCGCGCCGCTCGCAGC[CG]CCTTTTCTGC CACCAACTGTATCTCTCACTCGCGGAGCCGGCACAG CGACAGGCGCCCCG |
| SEQ ID NO: 19 | cg01650149 | GCGGCGGCGGGCGGGGAGCCAGGCCCGAGCTGCGT TCTGCGCAGCCATTGGTGGGCGCCG[CG]CTCTGCAC TGAGCATGTTCGCGCCCCGCCGGCCCCTAGCCGCAG CCGCAGCCGCAGCGAC |
| SEQ ID NO: 20 | cg17445666 | CAACCGGTTCCGCCGCGTTTGTGGGCTGGTAGCCCG GAATACATTTCCCAGAGGCCTTCG[CG]GCCGACGTG CTTCGCGCAGGAACGCAGCCGCCTCCCGACTGGAGG ACGCGGTAGCGGAGC |
| SEQ ID NO: 21 | cg24415208 | GCTGCCCGTGGTCAAACTGGAGTCGCTGAAGCGCTG GAACGAAGAGCGGGGCCTCTGGTG[CG]AGAAGGGG GTGCAGGTGCTGCTGACGACGGTGGGCGCCTTCGCC GCCTTCGGCCTCATGA |
| SEQ ID NO: 22 | cg24221648 | CTTCCCGGCTCCCCGCGGTGCGCACCCGCTGGCCAC TCTGCGCACGCGCGCCGGGTGCCC[CG]GCCTAAGGC CGTTGACCTCGGGTTCTCCCCGGCACAGTCGAATCC ACGCCAGGGCCCTCA |
| SEQ ID NO: 23 | cg09017434 | GCGGGGAGGTTGCGGGGAGGCTCGGCGTCCCCG CTCTCCGCCCCGCGACACCGACTGC[CG]CCGTGGCC GCCCTCAAAGCTCATGGTTGTGCCGCCGCCGCCCTC CTGCCGGCCCGGCTGG |
| SEQ ID NO: 24 | cg15814717 | TGTACTACTTCCTCTGCCACCTGGCCTTGGTAGACGC GGGCTTCACTACTAGCGTGGTGC[CG]CCGCTGCTGG CCAACCTGCGCGGACCAGCGCTCTGGCTGCCGCGCA GCCACTGCACGGCC |
| SEQ ID NO: 25 | cg23619365 | AAAAAAAAAAAAAGCAATGAGCCGCAAGCCTTGG ACTCGCAGAGCTGCCGGTGCCCGTC[CG]AGAGCCCC ACCAGCGCGGCTCACGCCTCAGTCTCGCCGCCCCAA GGTGGGATCCGACGCC |
| SEQ ID NO: 26 | cg20457275 | CGAGAGGGCCCGGTCCAGCAGCCTCTGGGGCCCAGT GCGCAGGGCACTGCGGGCCGATTG[CG]CCCCGGGGC CAGGAGGCGCCGAGAAAGCAAAAGCAAAAGCCGGC GGCGGGTGGAGGTCAA |
| SEQ ID NO: 27 | cg22305167 | CGGCCGCAGTGTGCCGCCCGCTGCGCTATGCGGGGC TCGTCTCCCCGCGCCTATGTCGCA[CG]CTGGCCAGC GCCTCCTGGCTAAGCGGCCTCACCAACTCGGTTGCG CAAACCGCGCTCCTG |
| SEQ ID NO: 28 | cg16664405 | CCTGGCGCGACCGCCAGCAGCACCCAGCGCGGGGC CGGGAGCTGCTGGGGGCCCAGGCTC[CG]CTCTCCCC ACCGCTCTGCACCGCTGCCGGCTGCGGACAGACCCG ATGCGCCACCACCACC |
| SEQ ID NO: 29 | cg16585333 | CCGGAGCGCGCTGCTGCCCTCTACCGGTCATCCGTG CGGCCGGACACCGTGTCAGGCCCG[CG]AGGAGGGC TCTGCCGCAGTCCCGGGGAACAGCACCCAGCAGCGC CACTGGGAGAGGAAAC |
| SEQ ID NO: 30 | cg05057720 | AGTCCAGAGCGGCGCTGTGCAGCTGGAAGGGCGCG CGATAGCTCAAGTTAGAGGCGGCCC[CG]GGGCGCG GCGCAGGACACAAGACCTCAAACTGGTACTTGCACA GGTAGCCGTTGGCGCGC |
| SEQ ID NO: 31 | cg03419058 | GGCGGTGCGAGCTCCCCGCCTGCGGGACGCACGGA GACCGCGGTCAGCGCGCCGCCTGGC[CG]GCCCAGCG CGCCCAGCCCGCGCCCAGCCCCGTCCACTCCCGTCC AGCCCCGCCGCCCGGC |
| SEQ ID NO: 32 | cg02473540 | CGGTAGAGTTTCCAACACGAAAGCCCGTGTGGTCGC GCCGGGAGCTCACGGCGTTCCAAG[CG]GCACTTATC CCGCGTTGATGCCCAGGCACCCCGCGCGCCCTGTTT CACCAGGCCCAGTCA |

-continued

| SEQ ID NO | Probe | Probe with CpG marked |
|---|---|---|
| SEQ ID NO: 33 | cg01758512 | CCAGCGGCAGTAGCTGTAGCAGCTTCAGCGAAGCCG GAGATGGGCAGAGAGCGCGCGCGG[CG]CAGCAGCT CCAGATTCACTGCTCTCCCCTGCAGCTCCCCGCGCCC CCGCCGCTGTCGCTG |
| SEQ ID NO: 34 | cg18897632 | GTGTTCTCTGCGGCGGGCCGCGTCCCCGCTGAGCCT CGCGGTGACAGCCGCCTTTGGCAG[CG]AGCGCTCGG GGCACTTCTATCCCCGCCTCTCAAAGGGTGGGGACA GCCGTTTCCAGATTT |
| SEQ ID NO: 35 | cg09568464 | CGGCCGCGCCCCCGGCAGCCCAGGGCGCGCTTCCAC CACGGTACCGGTGGATTCGCCGTG[CG]CAGCCGGAA GATGGCGCAGACGCACAAAGCACACCGATGCTGCG CCATGATAGGGCCGGC |
| SEQ ID NO: 36 | cg15811515 | TCTCGCGGCGCAGGCGGCGGCGGCAGAGGTGGGGT CGCGCAGCGGAGGCAGCTCGAGCTT[CG]GGATGCGC GCTCGCTTCTTGGGCTCCTCGCTCGATCTTACTGCCC CCTTTTTTCTCTCCC |
| SEQ ID NO: 37 | cg00884040 | TCCTCCAGCCAGAGTCGGTGGGACTGGCTGCGCTGC CCTGAAGTGGTTCTCCAAGCAGCG[CG]GAGGGTGGC GGACGGCGGACGGAGCCCAGGGGCCGCGTCGGGTG GGGAAACCCGAACTCG |
| SEQ ID NO: 38 | cg21632158 | TGCGCATCGCTGGCTCTGGGTTCCGCCGAATGCGTC CTCCTGGCGGTGATGGCTCTGGAC[CG]CGCGGCCGC AGTGTGCCGCCCGCTGCGCTATGCGGGGCTCGTCTC CCCGCGCCTATGTCG |
| SEQ ID NO: 39 | cg18343957 | AGGGGAGCTGCGAGGCGAAGTGTTCTTCAGGGAAG CGGGCTCGAGTCTCCGCAGCTGCGG[CG]GCGGCGGC GGCGCGCTGGGCCGGCGGCGGGCGCGGGCAGGGGG CCGGGGGTGCCGCGCGG |
| SEQ ID NO: 40 | cg23883696 | CCTCCACCCCCGGGGGGTTCCTGCGCACTGAAAGAC CGTTCTCCGGCAGGTTTTGGGATC[CG]GCGACGGCT GACCGCGCGCCGCCCCCACGCCCGGTTCCACGATGC TGCAATACAGAAAGT |
| SEQ ID NO: 41 | cg24403845 | AGAGAGGGGTCCCAGAACGAAGGTGGCGGCACGAG CTCTGCGCTGGCGGCTGTGGGGGGC[CG]GCGCTCAG GACCCCAACTCCATCCAAGTTGCGCCGCGCGGTGGGGG CGGGCGGAGGCGGCGC |
| SEQ ID NO: 42 | cg20405017 | AATCTCCCCTCGGGCTCGACGGATGTGCGCCCCAGA TGTGCTGACACATGTCCGATGCCT[CG]CTGCCTTGG AGGTCTCCCCGCTCGCGTGTCTCTTCTCTTCGCACCA GCGGCGGAAACCGC |
| SEQ ID NO: 43 | cg21678377 | GCTCCGCTTCTCCGGGTTTTAGCGGAAGCCTGCGGG GGGCGGGGTAACCGCGGAAGCCGG[CG]GCCGTGGG CGCGCGGGTTGGGGGCTCTCGCGCCGCTCCGGGCTC TCCCCCCCCCGGCTG |
| SEQ ID NO: 44 | cg03753331 | CGCGCTCCGCTTCTCCGGGTTTTAGCGGAAGCCTGC GGGGGGCGGGGTAACCGCGGAAGC[CG]GCGGCCGT GGGCGCGCGGGTTGGGGGCTCTCGCGCCGCTCCGGG CTCTCCCCCCCCCGG |
| SEQ ID NO: 45 | cg16587616 | GCGAGGGATCTCTGTGCGTCCTCACTGGCCCATGCA CCCAGCACCTGCGACTCCCGCCGT[CG]GGCTGCGTG GCCCCGCGCCCACACCTGCCCGTCCCTTCCGTCGTCC CTCGCTCGCGCAGA |
| SEQ ID NO: 46 | cg25730685 | GGGGAGGTGTGGGGAGCGGAAGGCCGCAGGAGCAT CTTTTGCGGAGAAAGTACTTTGGCTG[CG]GCGGGCGC AGGGCGGGCCGGCTAGCCCCGCGCCCCACCTGTTCT GTGCGTCGCGCTCGCC |
| SEQ ID NO: 47 | cg20019985 | TAGGGCTGGAAACCCGCCGCCACAGCGGGCTAGAG GTCGTCCCCGCCCGCAACATATGCG[CG]AAGGAAAG TGCTACGAACGTCAAATGGCCGCCCCCCGCCGACGC CATCTGCTCTGCGAAG |

| SEQ ID NO | Probe | Probe with CpG marked |
|---|---|---|
| SEQ ID NO: 48 | cg03730428 | CGCCCGCAACATATGCGCGAAGGAAAGTGCTACGA ACGTCAAATGGCCGCCCCCGCCGA[CG]CCATCTGC TCTGCGAAGCAGAAACGGCGGCAGCTGCGCGCCCA GTCCCTCCGCCCGCGCC |
| SEQ ID NO: 49 | cg18384778 | CCCCCTGTTCAAGGTCTGTCACCGTAGGGGCGGGG GGGCGCGTGGAGCCGCTGGGGGTT[CG]GCCCACCCC GCGAACCGAGCTCCCGGCCCTGTGCGCCCTCAGCTC TGCCGCGGGCGTTGG |
| SEQ ID NO: 50 | cg22010052 | GCTGTGGCCGCAGCTGAGGCCCGACGAGCTTCCGGC CGGGTCTTTGCCCTTCACTGGCCG[CG]TGAACATCA CGGTGCGCTGCACGGTGGCCACCTCTCGACTGCTGC TGCATAGCCTCTTCC |
| SEQ ID NO: 51 | cg19688250 | GTGTGCGTGTGCGTGTGCTCAGCCTCAGCGTGAGGG GCACCTGCTCGTCTGGGCTCACAG[CG]AAGGCAGCC TCGCCGCGAGCTGCCGCTGCCGCTGCTGCCGCCACT GGTGTTGCCGCTCTC |
| SEQ ID NO: 52 | cg04701034 | TGGGGCAGCGGCGTTGCAGGAGATGAGCTCAGCGC AAAGGGAACCCCGCAGCGGCGAGTG[CG]GCTGCTG GCCTGCGCGCTGTGGCCCCAACAGGCTGGCAGGGCG CGGGCGGGTGGCGGGGT |
| SEQ ID NO: 53 | cg20505704 | AGAGTCGGTGGGACTGGCTGCGCTGCCCTGAAGTGG TTCTCCAAGCAGCGCGGAGGGTGG[CG]GACGGCGG ACGGAGCCCAGGGGCCGCGTCGGGTGGGAAACCC GAACTCGCGGAGGGGAA |
| SEQ ID NO: 54 | cg15124215 | AAAGCCCTGGCAGGTAAAGAGAGGACCCGCGCAGG CTGGGAGCTCCCACTCCTCCTCCAG[CG]TCACGCTC GCCCTCCGCCGCTGCCTCGCGTCCGGGTCTGTTTATA TAGCGTCTGGAGGCC |
| SEQ ID NO: 55 | cg07143083 | CTGGCCAAGTGCCGGCCCATCGCGGTGCGCAGCGA GACGCCTTCCACGAGATCCGGCCG[CG]CGCCGAGGT GGCCAACCTCAGCGCGCACAGCGCCAGCCCCATCCA GGATGCGGTCCTGAA |
| SEQ ID NO: 56 | cg00688962 | GGCGCCGGCAGCTTCGCGCCGGCGGCTGGAAGCGG GCGGGCTGCACGGGCGGCTCGAGTG[CG]GGGACCC CAGCCCCTCGCCCTCGTGAGCGCCGCCCCTGCCACC TGCTGCCAAGTCACCGG |
| SEQ ID NO: 57 | cg00027083 | CCCCGGCCGCGCCGGGCGCGGGGCTCGGGATTCGGG AGACCGCGCGGCGCCGAAGCCACG[CG]TCAGCCCC ACTGTCCCGCGCGCCTCGCCCCAGGCCTCGGGCTCT TCCTCCGCACCTCGTA |
| SEQ ID NO: 58 | cg08305436 | ACGCGGGGACTGGAAAGGGCGCCTGGGTGGGAAGA GGCGCTGGCGGGTGATCGTCCCCAC[CG]GGCCAGTC CCCGGGATCTGCTGCCGCCCCTCTCCGAAATTCACA GCCAGAGCGGGCGCAC |
| SEQ ID NO: 59 | cg14638883 | TCTGAGAAGTGTCCTCCTCGCTCTCTTATAAAAACA GGACTTGTTGCCGAGGTCAGCGCG[CG]CATCGAGTG TGCCAGGCGTGTGCGTGGTTTCTGCTGTGTCATTGCT TTCACGGAAGGTGG |
| SEQ ID NO: 60 | cg09907509 | GCGCCCAGACTGCGCGCCGCGCCGCTGCGCCCAACA TTCCCGAGGACGGCTTCGCGGGCG[CG]TATCGTCCA GACCGGAGCACCGCCCCACCGCTAGCGCAGGAGAC CTGCCGGGGAAGTCGC |
| SEQ ID NO: 61 | cg20707222 | AAAGGCCGTACTCTGCCCCCCGCGGGACCCAGGTCC CCGCCTGCTGCAGAGCGCACTCTG[CG]CACGTCGAG CCGCGAAAGGTTCACAGAAGAAAACAAGAGAAAGA AGTAGCAGGCACTGAG |
| SEQ ID NO: 62 | cg17056618 | GGAATCCATTCTTTTAAGCCAGGGTTTAAAACTCTTC AAGCAAGTCATCTGCAAAGGTAC[CG]CTTCTACCAT TTTAAAGATAGGATTATGTTCCCTAGGACAACTGGA TGAGCCCTAGGAAC |

-continued

| SEQ ID NO | Probe | Probe with CpG marked |
|---|---|---|
| SEQ ID NO: 63 | cg18058689 | GAGGAGCGCGCCGCTGCCTCTGGCGGGCTTTCGGCT TGAGGGGCAAGGTGAAGAGCGCAC[CG]GCCGTGGG GTTTACCGAGCTGGATTTGTATGTTGCACCATGCCTT CTTGGATCGGGGCTG |
| SEQ ID NO: 64 | cg22620221 | CCCTGTGCGTGCCGCCGCGCTGTTGCTCGCAGTGTG CTGGCGCCGAGCTCGGTGGACACG[CG]CGCAGTCAG AGCTGCCTCTCGCCCTCGCTAGCTGGGCTCGCAGCC TCTTCCTCCCTCCCT |
| SEQ ID NO: 65 | cg02547394 | CTCTTTGGCAAGTGGTTTGTGCATCAGGAGAAACTT TCCACCTGCGAGCCGAACCGGCGC[CG]AGTGCGTGT GTTTCTGCCTTTTTTTGTTGTCGTTGCCTCCACCCCTC CCCATTCTTCTCT |
| SEQ ID NO: 66 | cg09469566 | TGGCTGCCAGAGCGAGTGAGGGGCGCAGAGGCGGC AGAGAGCGGAGAGCCCCGGTGTCTC[CG]CGAGGGC GGCGGCGGCCAGCAGACGGCGATCGAGGCGCGCGC CACGGCACGGCCAGCGCA |
| SEQ ID NO: 67 | cg26609631 | AAGCGCGTGGAGAGCCGAAAGGTGCGGTGGGCGCA GAGGGCGGGCTGGCTGCGGGGCGAC[CG]CGCGCCG GGGCCATGCCGCGCTCCTTCCTGGTGGACTCGCTAG TGCTGCGCGAGGCGGGC |
| SEQ ID NO: 68 | cg10132208 | GGGGTCGCCATGACCGAGTGGCCCAGGCCCGAGCG AAGCCCGCGCGGTGAGTCCGCCG[CG]GCCCATCC GTCCCTCCGCCCGCCAGAGCGTCCATCGGGACGCCC ACCCGGGAGGGTCTCG |
| SEQ ID NO: 69 | cg06000994 | CCGAGCGCTGCCCCCGCCGGCCCGCGGCTGCCAGCC GGCCCTGCCCGCGCCCGGGCCCCG[CG]AGCGGCCGC ACTTCACCTTACGGAGGGGAGATAATGAGATCAATT AGAGGCGCCGTCACC |
| SEQ ID NO: 70 | cg10182317 | GGCAACCCTGACTCGGACCGCTCGGGAGAGCCCCAG GAGAGGCCAGCGCCGCGCAGCAGC[CG]CCCCGCTG CGCCCACCTCCCCGGCTGCTCCCGGAGGGCTCACAA AGGCGGTGGCCGCCCG |
| SEQ ID NO: 71 | cg14222229 | GCGGGCGGCAGCCGCAAGCGAGGAATCCAGCGCAG GGAAAGTAGCCCCAGTGGGGCCCGG[CG]CGTCAGC CCCACTCGCGTGGCAAAACTTGCGGGGGCCCCCGCG TGCCGCGCCTCAGCCCA |
| SEQ ID NO: 72 | cg04596005 | TCCTCGCCGTCGGGGTCCTCCTCCTCTGCCGACGAGT TGTCACTGGGCGAGGCGTAGCTG[CG]CTCTACGCCG CGGAGGGGCGGCCTCTTGGAGGCGGGGACCGGGTA CTCCCGCTGCAGCCC |
| SEQ ID NO: 73 | cg11592503 | GCTGCTCGCGCTCCGCCGCCCGGGAGATGCTTCCTC GCGCGGCGCAGCGCTGAGGCCGTG[CG]TGCGCCCCG GCTGCGCTGCGCGCTCCCCACATACACAAGCTCTCC ATGTGAGCTGACAGG |
| SEQ ID NO: 74 | cg05008595 | CTTCTCTTGAAAAGGAGGAGAATCAACACTGGGCTC ACAACTCATCAGAGCTGAGTCATA[CG]TACATCAGC AGGACCTACGTGGGAACCAAATAGCAAACTCAAATT GGGAAATTTGAGGAA |
| SEQ ID NO: 75 | cg04999026 | CCGAGAGCCCCGCCTGCAGGCGGTGTAGATACATGT AGATACTGTAGATACTGTAGATAC[CG]CCCCGGCGC CGACTTGATAAACGGTTTCGCCTCTTTTGGAAGCCG CCTGCGTGTCCATTT |
| SEQ ID NO: 76 | cg04546413 | TGAGGAGTGAGGAGGCAGAAAGGACCGAGAACAAG GGGACCCGGTTCCATTTCTGGACCC[CG]TCCGCAGG CTGCTCGCCCGACTTGGGGTCGCTCTGCCCCGGACG ATCAGGACAGCTGCGT |
| SEQ ID NO: 77 | cg27254667 | CAAATCTATATGAAGGATCGAATTGCATTGAACTAG CAAACACACACACACACACGCACA[CG]CAAAAACT GATGAAAGCTGAACAAGGTCTGTAGTCTAGTCAACA GTACTGCACTATGTGA |

-continued

| SEQ ID NO | Probe | Probe with CpG marked |
|---|---|---|
| SEQ ID NO: 78 | cg18902440 | ACAGTCTCTCGCCTCAAAGATCTCCGCCATTAGTGG TAGCCATTTAAGAAAACAGAATTA[CG]ATGAATAAT GATTTGAAGCCAAAAAGTCAAAATATCTTATTTCGC AACTGTAATTGCTGG |
| SEQ ID NO: 79 | cg01315092 | CCACACAGGCCTCTCCCTCGGTGCGGTAGCGAGGGT TGCGGGCCCAAACGCCCGCGCCCA[CG]GAGGCGCCT GCGACGACTAGAAGCTTCCACAGCCATATGGGGCA AAGACGGCCCAGTAG |

In an embodiment of the present invention, it discloses a panel of DNA methylation biomarkers for screening and early detection of cervical cancer, wherein the panel comprises of CGIDs derived by the APDMA method having sequences selected from the group consisting of SEQ ID NO: 1 to SEQ ID NO: 79, and optionally said panel is used in combination with other biomarkers as early predictors of cervical cancer.

In an embodiment of the present invention, the polygenic DNA methylation biomarkers are a combination of CGIDs in the list below in Table 2 or a short subset of this list such as the example listed below in Table 3 for early detection of cervical cancer and risk of cervical cancer in women with CIN1 to CIN3 precancerous lesions.

Thus, in an additional embodiment of the present invention, it discloses an in-vitro method for obtaining early predictors of cervical cancer, the method comprising the steps of: (a) measuring DNA methylation from a cervical specimen sample, (b) performing statistical analysis on the DNA methylation measurement obtained in step a, (c) determining DNA methylation status of a multitude of independent genomic CG positions called CG identifiers (CGIDs) by performing analysis of progressive DNA methylation alterations (APDMA) of genome wide DNA methylation profiles obtained in step b, (d) classifying CGIDs based on frequency of their DNA methylation correlating with cervical cancer premalignant stage progression, (e) obtaining candidate CGIDs from classification in step d to obtain early predictors of cervical cancer as DNA methylation biomarkers, wherein said candidate CGIDs as the early predictors of cervical cancer as DNA methylation biomarkers, wherein the CGIDs are selected from a group as set forth in SEQ ID NO: 3, SEQ NO: 4, SEQ ID NO: 7, SEQ ID NO: 17, SEQ ID NO: 19, SEQ ID NO: 31, SEQ ID NO: 34, SEQ ID NO: 39, SEQ ID NO: 42, SEQ ID NO: 43, SEQ ID NO: 49, SEQ ID NO: 56, SEQ ID NO: 57, SEQ ID NO: 58, SEQ ID NO: 65, and SEQ ID NO: 70.

Table 2: Selected Subset of Polynucleotides from Table 1 Having CpG Methylation Sites Useful in Embodiments of the Present Invention.

The 16 CGID biomarkers discussed herein are found in Table 2 that is included with this application. These 16 shortlisted DNA methylation biomarkers were hypermethylated between CIN3 and CIN1 and control, with highest effect size (Cohen D>1.3) between CIN3 and control and highest Spearman correlation with progression of CIN phases r>0.4.

| SEQ ID NO | Probe | Probe with CpG marked |
|---|---|---|
| SEQ ID NO: 3 | cg13944175 | CCGCCGCGGGTTCCCAGGGCTGGTGGTAGTTGCCG TCCCACACGTACGTGGCGGGGTCCT[CG]TCAGCGA AGACCTCGCGGAACATGTCGACCATGTAGAGGTCC TCGGCGCGGTTGCCATCC |
| SEQ ID NO: 4 | cg19717586 | GGGGAGGAATATTAGACTCGGAGGAGTCTGCGCGC TTTTCTCCTCCCCGCGCCTCCCGGT[CG]CCGCGGGT TCACCGCTCAGTCCCCGCGCTCGCTCCGCACCCCAC CCACTTCCTGTGCTCG |
| SEQ ID NO: 7 | cg11358689 | GAGGAATATTAGACTCGGAGGAGTCTGCGCGCTTT TCTCCTCCCCGCGCCTCCCGGTCGC[CG]CGGGTTCA CCGCTCAGTCCCCGCGCTCGCTCCGCACCCCACCCA CTTCCTGTGCTCGCCC |
| SEQ ID NO: 17 | cg17233763 | GTGTGCTCAGCCTCAGCGTGAGGGGCACCTGCTCG TCTGGGCTCACAGCGAAGGCAGCCT[CG]CCGCGAG CTGCCGCTGCCGCTGCTGCCGCCACTGGTGTTGCCG CTCTCAGGCGCCAGGCT |
| SEQ ID NO: 19 | cg01650149 | GCGGCGGCGGGCGGGGAGCCAGGCCCGAGCTGCG TTCTGCGCAGCCATTGGTGGGCGCCG[CG]CTCTGCA CTGAGCATGTTCGCGCCCCGCCGGCCCCTAGCCGC AGCCGCAGCCGCAGCGAC |
| SEQ ID NO: 31 | cg03419058 | GGCGGTGCGAGCTCCCCGCCTGCGGGACGCACGGA GACCGCGGTCAGCGCGCCGCCTGGC[CG]GCCCAGC GCGCCCAGCCCGCGCCCAGCCCCGTCCACTCCCGT CCAGCCCCGCCGCCCGGC |

-continued

| SEQ ID NO | Probe | Probe with CpG marked |
|---|---|---|
| SEQ ID NO: 34 | cg18897632 | GTGTTCTCTGCGGCGGGCCGCGTCCCCGCTGAGCCT CGCGGTGACAGCCGCCTTTGGCAG[CG]AGCGCTCG GGGCACTTCTATCCCCGCCTCTCAAAGGGTGGGGA CAGCCGTTTCCAGATTT |
| SEQ ID NO: 39 | cg18343957 | AGGGGAGCTGCGAGGCGAAGTGTTCTTCAGGGAAG CGGGCTCGAGTCTCCGCAGCTGCGG[CG]GCGGCGG CGGCGCGCTGGGCCGGCGGCGGGCGCGGGCAGGG GGCCGGGGGTGCCGCGCGG |
| SEQ ID NO: 42 | cg20405017 | AATCTCCCCTCGGGCTCGACGGATGTGCGCCCAG ATGTGCTGACACATGTCCGATGCCT[CG]CTGCCTTG GAGGTCTCCCCGCTCGCGTGTCTCTTCTCTTCGCAC CAGCGGCGGAAACCGC |
| SEQ ID NO: 43 | cg21678377 | GCTCCGCTTCTCCGGGTTTTAGCGGAAGCCTGCGGG GGGCGGGGTAACCGCGGAAGCCGG[CG]GCCGTGG GCGCGCGGGTTGGGGGCTCTCGCGCCGCTCCGGGC TCTCCCCCCCCCGGCTG |
| SEQ ID NO: 49 | cg18384778 | CCCCCTGTTCAAGGTCTGTCACCGTAGGGGCGGG GGGGCGCGTGGAGCCGCTGGGGGTT[CG]GCCCACC CCGCGAACCGAGCTCCCGGCCCTGTGCGCCCTCAG CTCTGCCGCGGGCGTTGG |
| SEQ ID NO: 56 | cg00688962 | GGCGCCGGCAGCTTCGCGCCGGCGGCTGGAAGCGG GCGGGCTGCACGGGCGGCTCGAGTG[CG]GGGACCC CAGCCCCTCGCCCTCGTGAGCGCCGCCCCTGCCACC TGCTGCCAAGTCACCGG |
| SEQ ID NO: 57 | cg00027083 | CCCCGGCCGCGCCGGGCGCGGGGCTCGGGATTCGG GAGACCGCGCGGCGCCGAAGCCACG[CG]TCAGCCC CACTGTCCCGCGCGCCTCGCCCCAGGCCTCGGGCTC TTCCTCCGCACCTCGTA |
| SEQ ID NO: 58 | cg08305436 | ACGCGGGGACTGGAAAGGGCGCCTGGGTGGGAAG AGGCGCTGGCGGGTGATCGTCCCCAC[CG]GGCCAG TCCCCGGGATCTGCTGCCGCCCCTCTCCGAAATTCA CAGCCAGAGCGGGCGCAC |
| SEQ ID NO: 65 | cg02547394 | CTCTTTGGCAAGTGGTTTGTGCATCAGGAGAAACTT TCCACCTGCGAGCCGAACCGGCGC[CG]AGTGCGTG TGTTTCTGCCTTTTTTTGTTGTCGTTGCCTCCACCCC TCCCCATTCTTCTCT |
| SEQ ID NO: 70 | cg10182317 | GGCAACCCTGACTCGGACCGCTCGGGAGAGCCCCA GGAGAGGCCAGCGCCGCGCAGCAGC[CG]CCCCGCT GCGCCCACCTCCCCGGCTGCTCCCGGAGGGCTCAC AAAGGCGGTGGCCGCCCG |

In an embodiment of the present invention, it discloses a combination of DNA methylation biomarkers for screening and early detection of cervical cancer, said combination comprises of CGIDs derived using the APDMA method, for detecting cervical cancer by measuring DNA methylation levels of said CGIDs in DNA originating from cervical specimens and deriving a "cervical cancer methylation predictor" using linear regression equations and Receiver operating characteristics (ROC) assays, wherein the CGIDs are selected from a group as set forth in SEQ ID NO: 3, SEQ NO: 4, SEQ ID NO: 7, SEQ ID NO: 17, SEQ ID NO: 19, SEQ ID NO: 31, SEQ ID NO: 34, SEQ ID NO: 39, SEQ ID NO: 42, SEQ ID NO: 43, SEQ ID NO: 49, SEQ ID NO: 56, SEQ ID NO: 57, SEQ ID NO: 58, SEQ ID NO: 65, and SEQ ID NO: 70.

Table 3: Selected Subset of Polynucleotides from Table 2 Having CpG Methylation Sites Useful in Embodiments of the Invention.

The 2 CGID biomarkers discussed herein are found in Table 3 that is included with this application. The subset in Table 3 represents the minimal number of CGID biomarkers that differentiate CIN3 premalignant lesions from control identified using a penalized regression which reduced the number of CGIDs to 5, followed by a multivariable linear regression with these 5 CGIDs as independent variables and CIN3 state as dependent variable. A linear regression equation composed of weighted methylation levels of these two sites was highly significant for prediction of CIN3 ($p < 5 \times 10^{-15}$).

| SEQ ID NO | Probe | Probe with CpG marked |
|---|---|---|
| SEQ ID NO: 3 | cg13944175 | CCGCCGCGGGTTCCCAGGGCTGGTGGTAGTTGCCG TCCCACACGTACGTGGCGGGGTCCT[CG]TCAGCGA AGACCTCGCGGAACATGTCGACCATGTAGAGGTCC TCGGCGCGGTTGCCATCC |
| SEQ ID NO: 31 | cg03419058 | GGCGGTGCGAGCTCCCCGCCTGCGGGACGCACGGA GACCGCGGTCAGCGCGCCGCCTGGC[CG]GCCCAGC GCGCCCAGCCCGCGCCCAGCCCCGTCCACTCCCGT CCAGCCCCGCCGCCCGGC |

In an embodiment of the present invention, it discloses a combination of DNA methylation biomarkers for screening and early detection of cervical cancer, said combination comprises of CGIDs derived using the APDMA method, for detecting cervical cancer by measuring DNA methylation levels of said CGIDs in DNA originating from cervical specimens and deriving a "cervical cancer methylation predictor" using linear regression equations and Receiver operating characteristics (ROC) assays, wherein the said CGIDs are as set forth in SEQ ID NO: 3, and SEQ ID NO: 31.

In an embodiment, the present invention provides a kit and a process for detecting cervical cancer, comprising means and reagents for detecting DNA methylation measurements of a panel of polygenic DNA methylation biomarkers for cervical cancer.

In an embodiment, the present invention provides a kit for detecting cervical cancer comprising means and reagents for DNA methylation measurements of the CGID biomarkers of Table 1.

In an embodiment, the present invention provides a kit for detecting cervical cancer, comprising means and reagents for DNA methylation measurements of CGIDs and deriving a DNA methylation predictor of cervical cancer and an instruction manual, wherein the CGIDs are as set forth in SEQ ID NO: 1 to SEQ ID NO: 79.

In an embodiment, the present invention provides a panel of CGIDs in the form of a chip for detecting cervical cancer, wherein the panel of CGIDs are as set forth in SEQ ID NO: 1 to SEQ ID NO: 79.

In an embodiment, the present invention provides a use of CGID biomarkers disclosed in the present invention.

In an embodiment, the present invention provides a use of DNA pyrosequencing methylation assays for predicting cervical cancer by measuring DNA methylation of CGIDs, wherein the CGIDs are as set forth in SEQ ID NO: 1 to SEQ ID NO: 79.

In an embodiment, the present invention provides use of DNA pyrosequencing methylation assays for predicting cervical cancer using CGID biomarkers listed above, for example using the below disclosed primers and standard conditions of pyrosequencing reactions recommended by the manufacturer (Pyromark, Qiagen): cg03419058

SEQ ID NO: 80 - Forward (biotinylated):
GGTTTTTGGGTAGGAAGGATAGTAG

SEQ ID NO: 81 - Reverse:
AAACAAATCTAACCCCTAAAAAAAC

SEQ ID NO: 82 - Sequence:
CAAACTAAACACACTAAACC cg13944175

SEQ ID NO: 83 - Forward:
GGGTTTTTAGGGTTGGTGGTA

-continued

SEQ ID NO: 84 - Reverse (biotinylated):
TCCTCATAATAATAAATAACAACC

SEQ ID NO: 85 - Sequence:
TATGTATGTGGTGGGGTT

In an embodiment, the present invention provides the use of DNA pyrosequencing methylation assays for predicting cervical cancer by measuring DNA methylation of CGIDs combinations, wherein the forward, biotinylated primer is as set forth in SEQ ID NO: 80, the reverse primer is as set forth in SEQ ID NO: 81, and the pyrosequencing primer is as set forth in SEQ ID NO: 82.

In an embodiment, the present invention provides the use of DNA pyrosequencing methylation assays for predicting cervical cancer by measuring DNA methylation of CGIDs combinations, wherein the forward, biotinylated primer is as set forth in SEQ ID NO: 83, the reverse primer is as set forth in SEQ ID NO: 84, and the pyrosequencing primer is as set forth in SEQ ID NO: 85.

In an embodiment, the present invention provides use of polygenic multiplexed amplicon bisulfite sequencing DNA methylation assay for predicting cervical cancer in cervical specimens' DNA by using CGID biomarkers listed above. For example, using the below disclosed primers and standard conditions that involve bisulfite conversion, sequential amplification with target specific primers (PCR 1) followed by barcoding primers (PCR 2) and multiplexed sequencing in a single next generation Miseq sequencer (Illumina), demultiplexing using Illumina software, data extraction and quantification of methylation using standard methods for methylation analysis such as Methylkit, followed by calculation of the weighted DNA methylation score and prediction of cancer.

The first PCR is performed as follows:

For CGID cg03419058

SEQ ID NO: 80 - Forward primer:
5' GGTTTTTGGGTAGGAAGGATAGTAG 3'

SEQ ID NO: 81 - Reverse primer:
5' AAACAAATCTAACCCCTAAAAAAAC 3'

For CGID cg13944175

SEQ ID NO: 83 - Forward primer:
5' GGGTTTTTAGGGTTGGTGGTA 3'

SEQ ID NO: 84 - Reverse primer:
5' TCCTCATAATAATAAATAACAACC 3'

To barcode (index) the samples, the present invention used a second PCR reaction with the following primers:

```
SEQ ID NO: 86 - Forward primer:
5'AATgATACggCgACCACCgAgATCTACACTCTTTCCCTACACgAC3'

SEQ ID NO: 87 - Barcoding primer (reverse):
5'CAAgCAgAAgACggCATACgAgATAGTCATCGgTgACTggAgTTCAg
ACgTg3'
```

(where the red bases are the index; and 1200 variations of this index are used)

In an embodiment, the present invention provides a use of multiplexed targeted-amplification bisulfite sequencing methylation assays on a next generation sequencer for detecting cervical cancer by measuring the DNA methylation levels of CGIDs combinations, wherein the CGIDs are as set forth in SEQ ID NO: 1 to SEQ ID NO: 79.

In another embodiment, the present invention provides a use of multiplexed targeted-amplification bisulfite sequencing methylation assays on a next generation sequencer for detecting cervical cancer by measuring the DNA methylation levels of CGIDs combinations, wherein the CGID as set forth in SEQ ID NO: 3 has primers as set forth in SEQ ID NO: 88 for the forward primer and SEQ ID NO: 89 for the reverse primer.

In another embodiment, the present invention provides a use of multiplexed targeted-amplification bisulfite sequencing methylation assays on a next generation sequencer for detecting cervical cancer by measuring the DNA methylation levels of CGIDs combinations, wherein the CGID as set forth in SEQ ID NO: 31 has primers as set forth in SEQ ID NO: 90 for the forward primer and SEQ ID NO: 91 for the reverse primer.

In an embodiment, the present invention provides use of Receiver operating characteristics (ROC) assays for detecting cancer by defining a threshold value between cervical cancer and normal cervix using weighted DNA methylation measurements of CGID biomarkers in Table 1 or a subset of these CGIDs such as in Table 2 as an example. Samples above the threshold are to be classified as cancer.

In an embodiment, the present invention provides the use of hierarchical Clustering analysis assays for predicting cancer with use in obtaining cancer positive early detection by using measurements of methylation of CGID biomarkers listed in Table 1.

In an embodiment, the present invention provides a use of mass spectrometry based (Epityper™) or PCR based methylation assays of DNA extracted from sample for detecting cancer by measuring the DNA methylation levels of CGIDs combinations as set forth in a panel of DNA methylation biomarkers for screening and early detection of cervical cancer, wherein the panel comprises of CGIDs derived by the APDMA method having sequences selected from the group consisting of SEQ ID NO: 1 to SEQ ID NO: 79, and optionally said panel is used in combination with other biomarkers as early predictors of cervical cancer.

In an embodiment, the present invention provides a use of multivariable linear regression equation or neural network analysis for calculating a methylation score predicting cervical cancer by using measurements of DNA methylation CGIDs combinations as set forth in a panel of DNA methylation biomarkers for screening and early detection of cervical cancer, wherein the panel comprises of CGIDs derived by the APDMA method having sequences selected from the group consisting of SEQ ID NO: 1 to SEQ ID NO: 79, and optionally said panel is used in combination with other biomarkers as early predictors of cervical cancer.

In an embodiment, the present invention provides a use of multivariable linear regression equation or neural network analysis for calculating a methylation score predicting cervical cancer by using measurements of DNA methylation CGIDs combinations as set forth in a combination of DNA methylation biomarkers for screening and early detection of cervical cancer, said combination comprises of CGIDs derived using the APDMA method, for detecting cervical cancer by measuring DNA methylation levels of said CGIDs in DNA originating from cervical specimens and deriving a "cervical cancer methylation predictor" using linear regression equations and Receiver operating characteristics (ROC) assays, wherein the CGIDs are selected from a group as set forth in SEQ ID NO: 3, SEQ NO: 4, SEQ ID NO: 7, SEQ ID NO: 17, SEQ ID NO: 19, SEQ ID NO: 31, SEQ ID NO: 34, SEQ ID NO: 39, SEQ ID NO: 42, SEQ ID NO: 43, SEQ ID NO: 49, SEQ ID NO: 56, SEQ ID NO: 57, SEQ ID NO: 58, SEQ ID NO: 65, and SEQ ID NO: 70.

In an alternate embodiment, the present invention provides a use of multivariable linear regression equation or neural network analysis for calculating a methylation score predicting cervical cancer by using measurements of DNA methylation CGIDs combinations, said CGIDs are as set forth in SEQ ID NO: 3, and SEQ ID NO: 31.

In an embodiment, the present invention provides a use of Receiver operating characteristics (ROC) assays to define a "methylation score" threshold differentiating cervical cancer from noncancer cervical tissue by using measurements of DNA methylation combinations as set forth in a panel of DNA methylation biomarkers for screening and early detection of cervical cancer, wherein the panel comprises of CGIDs derived by the APDMA method having sequences selected from the group consisting of SEQ ID NO: 1 to SEQ ID NO: 79, and optionally said panel is used in combination with other biomarkers as early predictors of cervical cancer.

In an embodiment, the present invention provides a use of Receiver operating characteristics (ROC) assays to define a "methylation score" threshold differentiating cervical cancer from noncancer cervical tissue by using measurements of DNA methylation combinations as set forth in a combination of DNA methylation biomarkers for screening and early detection of cervical cancer, said combination comprises of CGIDs derived using the APDMA method, for detecting cervical cancer by measuring DNA methylation levels of said CGIDs in DNA originating from cervical specimens and deriving a "cervical cancer methylation predictor" using linear regression equations and Receiver operating characteristics (ROC) assays, wherein the CGIDs are selected from a group as set forth in SEQ ID NO: 3, SEQ NO: 4, SEQ ID NO: 7, SEQ ID NO: 17, SEQ ID NO: 19, SEQ ID NO: 31, SEQ ID NO: 34, SEQ ID NO: 39, SEQ ID NO: 42, SEQ ID NO: 43, SEQ ID NO: 49, SEQ ID NO: 56, SEQ ID NO: 57, SEQ ID NO: 58, SEQ ID NO: 65, and SEQ ID NO: 70.

In an alternate embodiment, the present invention provides a use of Receiver operating characteristics (ROC) assays to define a "methylation score" threshold differentiating cervical cancer from noncancer cervical tissue by using measurements of DNA methylation combinations, said CGIDs are as set forth in SEQ ID NO: 3, and SEQ ID NO: 31.

In an embodiment, the present invention provides a computer-implemented method for obtaining candidate DNA methylation biomarkers for early detection for cervical cancer diagnosis, the method comprising: providing genome wide DNA methylation data of a multitude of independent genomic CG positions, CGIDs of human genome; processing the genome wide DNA methylation data by normalization and deriving normalized DNA methylation beta values; computing Spearman correlation with the normalized DNA methylation beta values between stages of progression of premalignancy, and untransformed cervical cells; obtaining candidate CGIDs with an analysis of progressive DNA methylation alterations (APDMA) to obtain candidate DNA methylation biomarkers for early detection for cervical cancer diagnosis.

EXAMPLES

The following examples are given by way of illustration of the present invention and therefore should not be construed to limit the scope of the present invention.

Example 1: Analysis of Progressive DNA Methylation Alterations (APDMA) Method for Identifying and Obtaining CG Positions (CGIDs) Whose Methylation Level is an Early Predictor of Cervical Cancer The present invention addresses one of the outstanding challenges in cervical cancer screening which is finding robust biomarkers that provide a highly accurate and sensitive assessment of risk that can guide early intervention and treatment. Common approaches have been using a case-control logistic regression on genome wide DNA methylation data to identify sites that are either more of less methylated in cancer cells versus controls. However, it is well known that many statistically significant DNA methylation alterations in cancer detected by these methods are heterogenous and many evolve late in the progression of cancer and therefore of very limited value in early detection, since they are diluted when the frequency of cancer cells in a specimen is low. Moreover, quantitative differences in methylation profiles rather than categorical differences could be erased in a mixture of normal and cancer cells. As is well understood, DNA methylation is a binary property, which means that a given cell is either methylated or not at a specific CG position in the genome.

In this example, the present invention relates to selected methylated CGIDs as fundamental characteristic of cervical cancer that are almost uniformly methylated across cervical cancer specimens, but are never methylated in normal tissue and despite being categorical for cervical cancer, they emerge very early in the premalignant stages in a milieu of normal cells and progressively increase in frequency from CIN1 to CIN3 stages advancing towards cervical cancer. Methylated CGIDs that are categorically different between normal and cancer tissues have been found to be detected even when cancer cells were found in low frequency in a specimen by deep sequencing of bisulfite converted DNA which provides single DNA molecule resolution. The frequency of molecules with a methylated CGID represents the fraction of cancer cells in the sample. Methylation measurements of such CGIDs by other methods would also determine the incidence of cancer cells in the specimen and is useful as DNA methylation biomarkers for risk and prediction of cervical cancer in the sample.

It is clinically known that a fraction of CIN premalignant lesions develop into cervical cancer, thus they offer a particularly unique window for detecting early DNA methylation alterations in cancer. Predicting early who is going to develop cervical cancer is of utmost clinical significance. The present invention provides a method to obtain such early detection DNA methylation biomarkers characterized by following technical features: first, methylated CGIDs that were categorically characteristic of early cancer cells were uniformly unmethylated in normal cervical tissue; second, these CGIDs were infrequently methylated in early premalignant specimens; third, the frequency of these primary methylated CGIDs should increase with progression of the premalignant stages from CIN1 to CIN3 as predicted by the increased risk of cervical cancer in women with CIN3 lesions; and fourth, since methylation of these CGIDs is a primary characteristic of cervical cancer, these CGIDs should be uniformly abundant in cervical cancer specimens. In this example, specific CGIDs whose methylation increases with progression of CIN stages from CIN1 to CIN3, were found to be ubiquitously methylated in cervical cancer specimens, while they were found to be uniformly unmethylated in normal tissue as delineated herein. Thus, the presently disclosed method of the present invention provides a panel of candidate CGID biomarkers for early detection of cervical cancer in women, particularly those with premalignant lesions.

The following steps of the progressive DNA methylation alterations (APDMA) method were performed to delineate CGID biomarkers whose state of methylation detects early cervical cancer as summarized in FIG. 1.

Cervical Specimens

The present invention used cervical specimens collected from women referred for colposcopic examination in a McGill University affiliated hospital because of an abnormal cervical cancer screening result or for initial treatment of a cervical lesion (19). Briefly, 643 women aged 16-70 years were enrolled between June 2015 and April 2016. Specimens were tested for the presence of HPV DNA of carcinogenic types with the Roche Cobas® 4800 HPV Test which detects HPV1 and HPV18 separately, and 12 other high-risk types (HPVs 31, 33, 35, 39, 45, 51, 52, 56, 58, 59, 66, and 68) as a pooled result. Cytology was classified according to the Bethesda classification as NILM: Negative for Intraepithelial Lesion or Malignancy; ASC-US: Atypical Squamous Cells—of Undetermined Significance; ASC-H Atypical Squamous Cells-cannot exclude HSIL; LSIL: Low Squamous Intraepithelial Lesion; HSIL: High Squamous Intraepithelial Lesion; AGC: Atypical Glandular Cells; and cancer (20). Cervical abnormalities were biopsied and histological results were graded by senior McGill pathologists as normal, CIN1, CIN2, CIN3, or invasive cancer. The study received ethical approval by institutional review boards at McGill University and the Jewish General Hospital. Study participants provided written informed consent.

The sample set comprised 186 randomly selected, physician-collected specimens of women. Of these specimens, 50 were CIN1, 40 CIN2, and 42 CIN3 compared to 54 specimens with a normal biopsy result.

DNA Extraction and Genome Wide Methylation Analysis

DNA was extracted from original exfoliated cervical cell specimens, suspended in liquid-based cytology PreservCyt solution (PreservCyt, Hologic Inc., Mississauga). Extracted DNA using Qiagen DNA extraction kit was subjected to bisulphite treatment and hybridization to Illumina Epic arrays using standard procedures described by the manufacturer at the Genome Quebec Innovation center in Montreal. Epic arrays provide an excellent coverage of the human promoter and enhancer repertoire, representing all known regions regulating transcription (21).

Normalization and Deriving Normalized DNA Methylation Values (Beta) for all Samples Samples were randomized with respect to slide and position on arrays and all samples were hybridized and scanned concurrently to mitigate batch effects as recommended by McGill Genome Quebec innovation center according to Illumina Infinium HD technology user guide. Illumina arrays hybridizations and scanning were performed by the McGill Genome Quebec Innovation center according to the manufacturer guidelines. Illumina arrays were analyzed using the ChAMP Bioconductor package in R by Morris et al., 2014 (25). IDAT files were used as input in the champ.load function using minfi quality control and normalization options. Raw data were filtered for probes with a detection value of P>0.01 in at least one sample. The present method filtered out probes on the X or Y chromosome to mitigate sex effects and probes with SNPs as identified in Marzouka et al., 2015 (24), as well as probes that align to multiple locations as identified in Marzouka et al., 2015 (24). Batch effects were analyzed on the non-normalized data using the function champ.svd. Five out of the first 6 principal components were associated with group and batch (slides). Intra-array normalization to adjust the data for bias introduced by the Infinium type 2 probe design was performed using beta-mixture quantile normalization (BMIQ) with function champ.norm (norm="BMIQ") (25). Then the batch effects were corrected after BMIQ normalization using champ.runcombat function.

Discovery of CGIDs Whose Frequency of Methylation Correlates with CIN Progression The present method then used the beta-values of the batch corrected normalized data to compute Spearman correlation between CIN stages (with stage codes 0 for non-transformed, healthy control cervical cells and 1-3 for CIN stages from CIN1 to CIN3) using the spearman corr function in R and correcting for multiple testing using the method "fdr" of Benjamini Hochberg (adjusted P value (Q) of <0.05). Methylation levels of 7715 CGIDs significantly correlated (q>0.05) with progression of premalignant CIN stages from 1 to 3 (refer to FIG. 2). Most of the sites were hypermethylated as premalignant lesions progressed from normal to CIN1 to CIN3 stages, while a small fraction was hypomethylated (refer to FIG. 2).

Shortlisting of Candidate CGIDs

Figure 3:
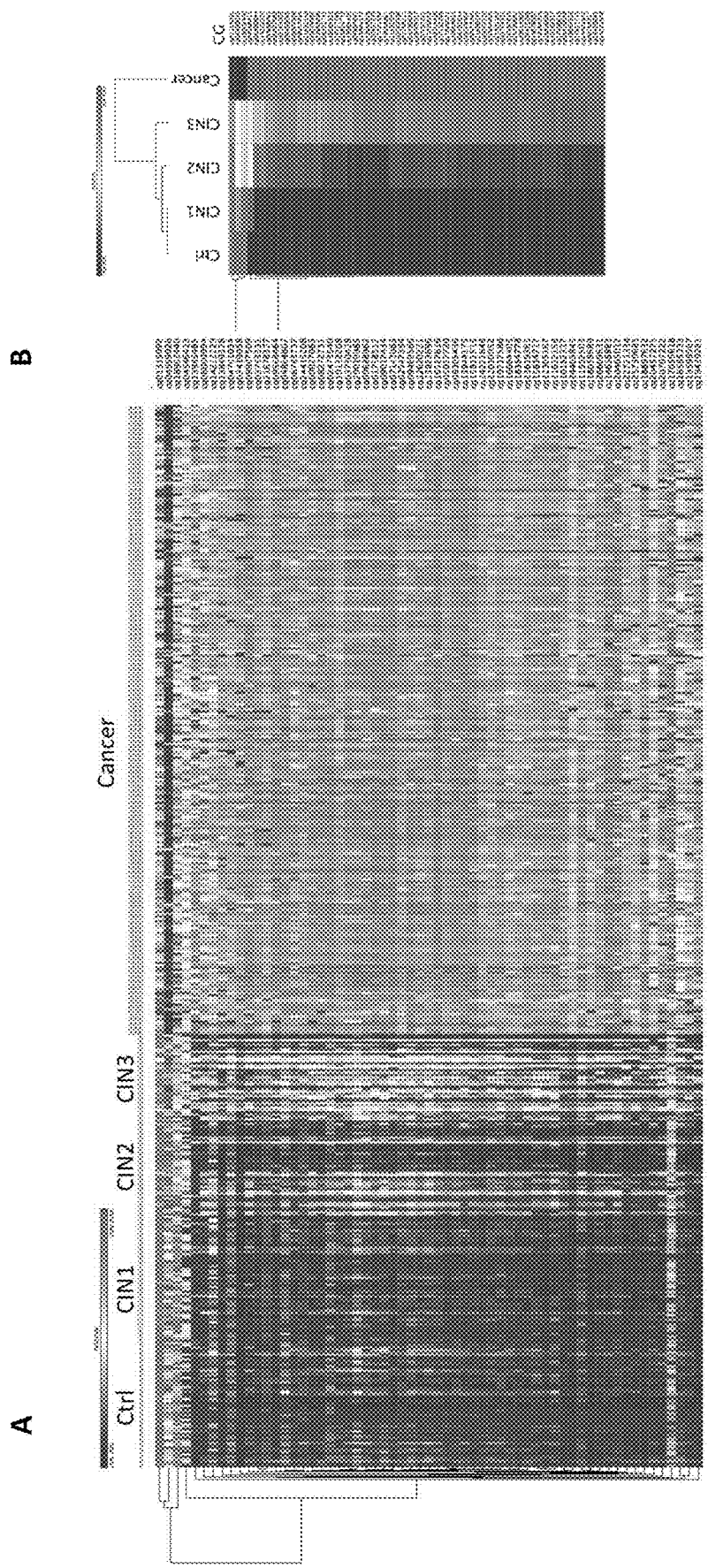
FIG. 3. Sites derived by the APDMA method are categorically different between normal cervical specimens and cervical cancer. A. Heatmap showing that 79 top CGIDs whose frequency of methylation increases during progression of cervical premalignant phases detect cervical cancer using DNA methylation data from 270 patients (GSE68339). The CGIDs exhibit a categorically different methylation profile between cancer and normal cervix. They are totally unmethylated in normal tissue and heavily methylated in cancer tissue. B. Average methylation for each of the groups normal, premalignant stages and cervical cancer (CIN1 to CIN3) (blue refers to 0% methylation and dark red refers to 100% methylation).

To identify CGID positions that address the assumptions of the APDMA method 79 progressively methylated CGIDs were shortlisted with average increase in methylation of 10% or decrease of more than 10% during transition from CIN1 to CIN3 and background methylation in normal cells (less than 10%) (refer to Table 1 herein above). The present method then tested whether these CGIDs uniformly identify cervical cancer in publicly available Illumina 450K genome wide DNA methylation data from 270 cervical cancer specimens (refer to GSE68339). Based on the tested CGID DNA methylation, the present method then generated a heatmap with these 79 CGIDs whose frequency of methylation increased during progression of cervical premalignant phases that were obtained by the presently disclosed APDMA method. The said heatmap revealed that these 79 CGIDs exhibit a categorically different DNA methylation profile between cervical cancer and normal cervix. The clear majority of sites were totally unmethylated in normal tissue and heavily methylated in cancer tissue while a small number of sites were methylated in normal tissue and unmethylated in cervical cancer (refer to FIG. 3). Thus, the present method relates to these hypermethylated CGIDs as preferred biomarkers since even a low frequency of methylation is clearly detectable on a background of totally unmethylated molecules.

Example 2: Discovery of a Polygenic DNA Methylation Biomarker Set for Early Detection of Cervical Cancer The present disclosure further shortlists 16 CGIDs from the list obtained and disclosed in the first example and in Table 1, where the said 16 CGIDs were hypermethylated between CIN3 and CIN1 and control, had the highest effect size (Cohen D>1.3) between CIN3 and control and highest Spearman correlation with progression of CIN phases r>0.4. (refer to Table 2 herein above).

Next, in order to obtain the minimal number of CGIDs required for differentiating CIN3 premalignant lesions from control, the present method performed a penalized regression which reduced the number of CGIDs to 5. The present method then performed a multivariable linear regression with these 5 CGIDs as independent variables and CIN3 state as the dependent variable. Two CGIDs remained significant (refer to Table 3 herein above). A linear regression equation composed of weighted methylation levels of these two sites was highly significant for prediction of CIN3 ($p<5\times10^{-15}$).

Figure 4:
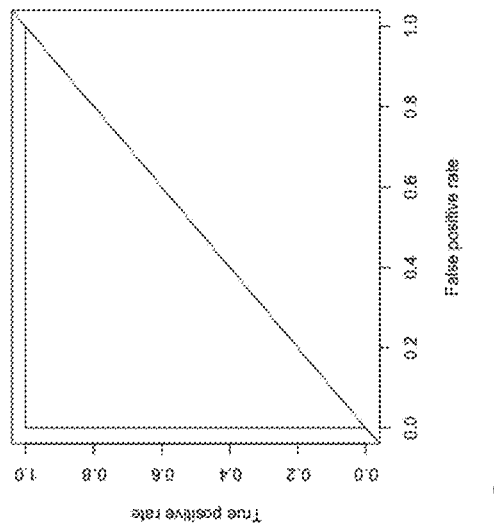
FIG. 4. Specificity and specificity of a bi-genic DNA methylation score discovered using the APDMA method for detecting cervical cancer DNA in an independent cohort. A. Effect size calculation, penalized regression and multivariable linear regression short listed a subset of two CGIDs and a linear regression equation for prediction of cervical cancer was computed. B. A threshold for cancer detection was calculated by ROC. C. Using this threshold, the sensitivity and specificity of this combined set of markers is 1 and the AUC is 1.

Example 3: Utility of Bi-Genic DNA Methylation Markers for Detecting Cervical Cancer Next, the present disclosure first validated the bigenic DNA methylation marker (cg03419058; cg13944175) on the publicly available data base of cervical cancer 450K DNA methylation (refer to GSE68339). A bivariable linear regression model with cervical cancer as the dependent variable and the level of methylation of the two CGIDs (cg03419058; cg13944175) as independent variables was observed to be highly significant ($p<2.2\times10^{-16}$, F=8703, R=0.9873). ROCs for the methylation scores (calculated using the linear regression equation as disclosed in FIG. 4A) were compared by calculating their area under the curve (AUC) (refer to FIG. 4B). The sensitivity and specificity of the bigenic methylation score for discriminating cervical cancer from normal cervical tissue was observed to be 1 (refer to FIG. 4C).

Thus, the above disclosed DNA methylation biomarkers and the calculated methylation score are useful for screening and early detection of cervical cancer in women at risk as well as the general healthy population of women using cervical specimens collected at routine gynecological checkup pap smears.

Figure 5:
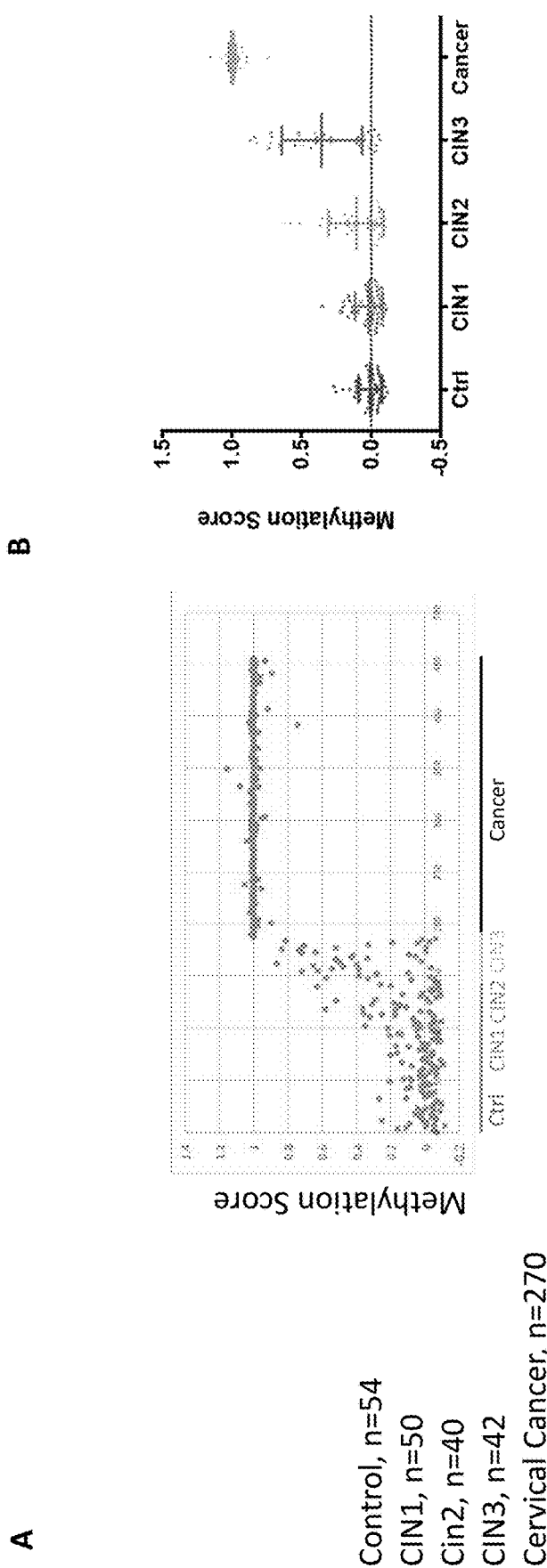
FIG. 5. Cancer methylation scores in individual specimens from control CIN 1 to CIN3 and cervical cancer patients. A. Methylation scores (cervical cancer prediction) calculated using the equation presented in FIG. 4A for each of the individual specimens from controls, CIN1 to CIN3 and cervical cancer showing increase in methylation scores in advanced premalignant lesions. B. Scatter plot showing average methylation score for the control, premalignant and cancer groups.

Example 4: Utility of Bi-Genic DNA Methylation Biomarkers for Measuring Cervical Cancer Methylation Scores in Individual Specimens from Healthy Controls, CIN1 to CIN3 and Cervical Cancer Patients Methylation scores (cervical cancer prediction) were calculated using the equation presented in FIG. 4A for each of the individual specimens from controls, CIN1 to CIN3 (from the McGill cohort described herein above in Example 1) and cervical cancer (refer to GSE68339) (refer to FIG. 5A), (for mean values for the different groups, refer to FIG. 5B). The results illustrate increase in methylation scores in advanced premalignant lesions as anticipated from the clinical observation of increased risk for cervical cancer with progression of CIN stages. Methylation scores could be used for screening of women with CIN lesions for risk of cervical cancer.

Figure 6:
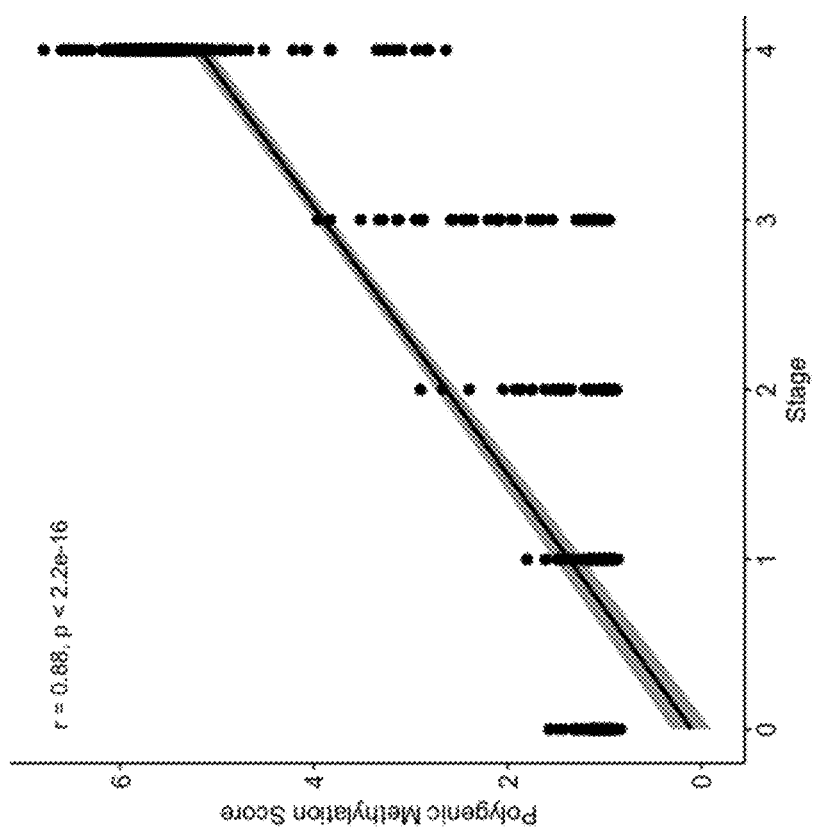
FIG. 6. Correlation between bi-genic methylation score and progression from control through premalignant stages to cervical cancer. Cervical cancer samples are from GSE68339 CIN1 to CIN3 are from the McGill cohort described in this application (assigned Spearman rank: control: 0, CIN1 to CIN3: 1-3, cervical cancer: 4).

Example 5: Spearman Correlation of Methylation Score and Progression of Premalignant Cervical Cancer to Cervical Cancer A Spearman correlation analysis was performed between methylation scores of cervical specimens from healthy, premalignant stages CIN1 to CIN3 and cervical cancer (Control, n=54; CIN1, n=50; CIN2, n=40; CIN3, n=42; Cervical Cancer, n=270). The results illustrate highly significant correlation ($p<2.2\times10^{-16}$ and $r=0.88$) between methylation score of bi-genic marker and progression from premalignancy to malignancy (refer to FIG. 6).

Figure 7:
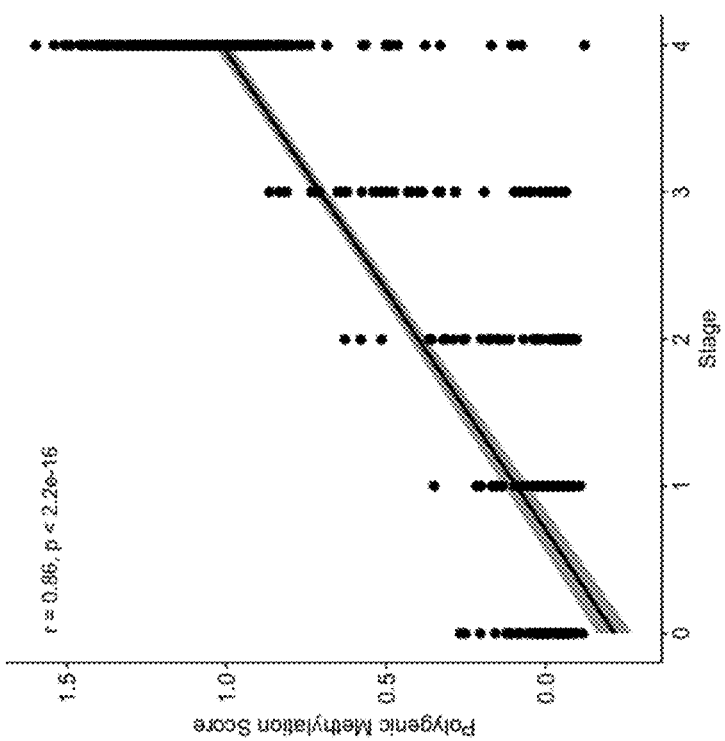
FIG. 7. Validation of methylation marker for cervical cancer using DNA methylation data from TCGA (n=312). Since data for cervical for only one CGIDs (cg13944175) was available in TCGA, we calculated the methylation score for cervical cancer using a linear regression equation with DNA methylation data for only CGID cg13944175. A Pearson correlation was calculated between stage of progression to cancer and the methylation score (see statistics in A and correlation chart in B). CIN1 to CIN 3 are from the McGill cohort described in this application. Assigned scales: Control: 0, CIN1 to CIN 3:1-3, Cervical cancer: 4.

Example 6: Validation of Methylation Biomarker (Cg13944175) for Detecting Cervical Cancer Since data for only one CGID biomarker was available in TCGA cervical cancer data, the present disclosure calculated the methylation score for cervical cancer using a linear regression equation with DNA methylation data for only said CGID, cg13944175. A Spearman correlation was calculated between stage of progression to cancer and the methylation score (refer to statistics in FIG. 7A and correlation chart in FIG. 7B). In this disclosure, CIN1 to CIN3 are from the McGill cohort as have already been described in this application in Example 1 and the assignment of the score is based on the assigned Scale: Control: 0, CIN1-3:1-3, respectively, and cervical cancer: 4.

Figure 8:
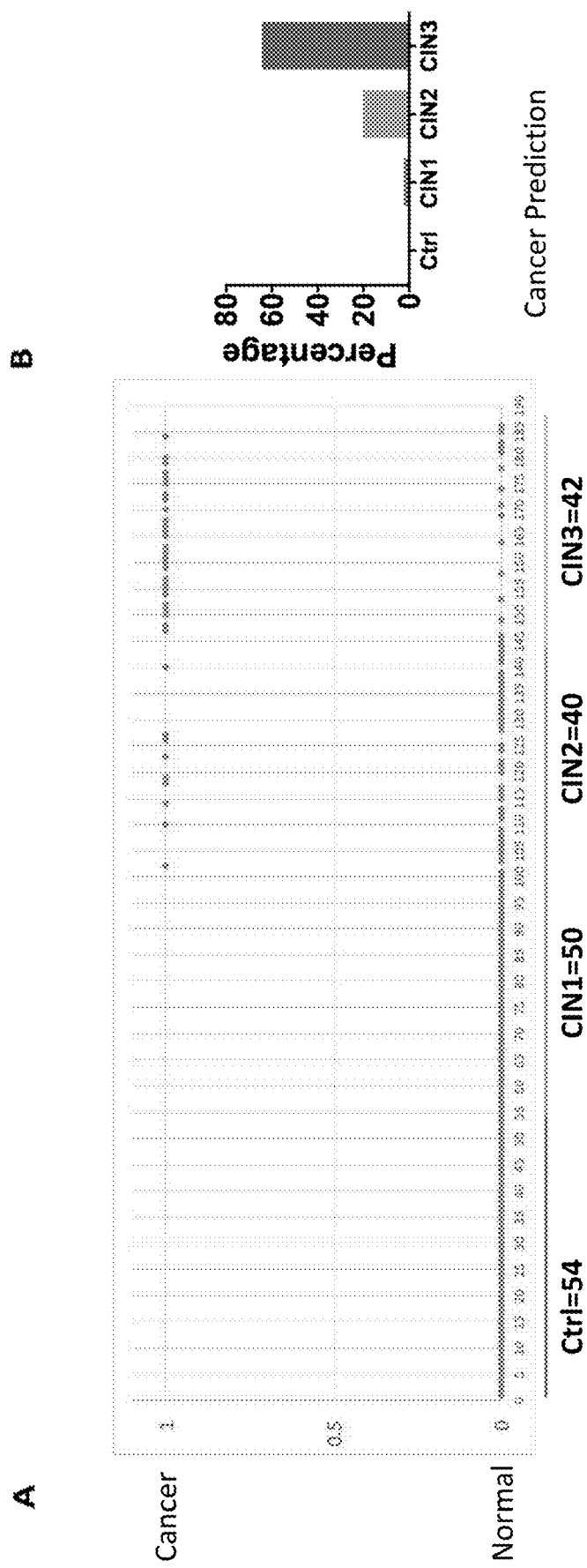
FIG. 8. Utility of the present invention: Prediction of cervical cancer in CIN1 to CIN3 specimens. Not all CIN-1-3 patient develop cervical cancer though a higher fraction of CIN3 patients than CIN1 patients do. The present invention tested whether the methylation score developed in FIG. 3 be used to identify individual patients who exhibit a cervical cancer methylation score as a demonstration of the utility of the present invention. A. The X axis lines up individual patients, groups are indicated by the lines under the X axis. The Y axis indicates prediction of cancer (1) and no cancer call (0). B. Number of individuals with cancer prediction in each group. Prediction of cancer increases from CIN1 to CIN3 as expected.

Example 7: Utility of Bi-Genic Methylation Biomarker for Detecting Cervical Cancer in Premalignant Cervical Specimens The bi-genic methylation biomarker was used to predict which of the CIN1 to CIN3 samples will progress to cervical cancer. Methylation scores were calculated for each specimen based on the methylation values for the two CG sites obtained from epic Arrays data. Using the threshold for cancer computed from comparisons of cervical cancer and healthy cervical specimens (refer to FIG. 3) a prediction was made for each of the samples (refer to FIG. 8A). The fraction of specimens that were predicted to become cancerous increased from a few in CIN1 specimens to 60% of the CIN3 specimens as expected (refer to FIG. 8B).

Although the invention has been explained in relation to its preferred embodiment, it is to be understood that many other possible modifications and variations can be made without departing from the spirit and scope of the invention.

Advantages

These novel DNA methylation biomarkers could be developed as a diagnostic kit for early and accurate diagnosis of human cervical cancer. They are direct indicators of cellular changes during the initiation and development of cervical cancer and present a fundamental characteristic of cervical cancer that are almost uniformly methylated across cervical cancer specimens, but are never methylated in normal tissue and progressively increase in frequency from CIN1 to CIN3 premalignant stages. These biomarkers complement pathology for accurate early detection of cervical cancer in CIN lesions as well as serve as early detection and as a risk prediction biomarker in asymptomatic women. These biomarkers provided a utility angle to the already existing epigenetic, DNA methylation markers which play a major role in gene regulation, usable in form of CGIDs as a tool of diagnosis. These biomarkers could provide a fast, cheaper, accurate, robust and high throughput diagnostic kit for accurate, early and as yet unfeasible diagnosis of human cervical cancer at as yet inaccessible premalignant stages.

REFERENCES

1. El-Zein M, Richardson L, Franco E L. Cervical cancer screening of HPV vaccinated populations: Cytology, molecular testing, both or none. *J. Clin. Virol.* 2015; 76: S62-S68. doi: 10.1016/j.jcv.2015.11.020.
2. Boers A, Wang R, van Leeuwen R W, et al. Discovery of new methylation markers to improve screening for cervical intraepithelial neoplasia grade 2/3. *Clin. Epigenetics* 2016; 8(29). doi: 10.1186/s13148-016-0196-3.
3. van Baars R, van der Marel J, Snijders P J F, et al. CADM1 and MAL methylation status in cervical scrapes is representative of the most severe underlying lesion in women with multiple cervical biopsies. *Int. J. Cancer* 2016; 138:463-471. doi: 10.1002/ijc.29706.
4. Verhoef V M J, Van Kemenade F J, Rozendaal L, et al. Follow-up of high-risk HPV positive women by combined cytology and bi-marker CADM1/MAL methylation analysis on cervical scrapes. *Gynecol. Oncol.* 2015; 137 (1): 55-59. doi: 10.1016/j.ygyno.2015.01.550.
5. Louvanto K, Franco E L, Ramanakumar A V, et al. Methylation of viral and host genes and severity of cervical lesions associated with human papillomavirus type 16. *Int. J. Cancer* 2014; 00(6): 1-8. doi: 10.1002/ijc.29196.
6. Simanaviciene V, Popendikyte V, Gudleviciene Z, Zvirbliene A. Different DNA methylation pattern of HPV16, HPV18 and HPV51 genomes in asymptomatic HPV infection as compared to cervical neoplasia. *Virology* 2015; 484:227-233. doi: 10.1016/j.virol.2015.06.008.
7. De Strooper L M A, Meijer C J L M, Berkhof J, et al. Methylation analysis of the FAM19A4 gene in cervical scrapes is highly efficient in detecting cervical carcinomas and advanced CIN2/3 lesions. *Cancer Prev. Res.* 2014; 7(6): 1251-1257. doi: 10.1158/1940-6207.CAPR-14-0237.
8. Mersakova S, Nachajova M, Szepe P, Kasajova P S, Halasova E. DNA methylation and detection of cervical cancer and precancerous lesions using molecular methods. *Tumor Biol.* 2015. doi: 10.1007/s13277-015-4197-1.
9. Nikolaidis C, Nena E, Panagopoulou M, et al. PAX1 methylation as an auxiliary biomarker for cervical cancer screening: a meta-analysis. *Cancer Epidemiol.* 2015; 39(5): 682-686. doi: 10.1016/j.canep.2015.07.008.
10. De Strooper L M A, Hesselink A T, Berkhof J, et al. Combined CADM1/MAL methylation and cytology testing for colposcopy triage of high-risk HPV-positive women. *Cancer Epidemiol. Biomarkers Prev.* 2014; 23(9): 1933-1937. doi: 10.1158/1055-9965.EPI-14-0347.
11. De Strooper L M A, Verhoef V M J, Berkhof J, et al. Validation of the FAM19A4/mir124-2 DNA methylation test for both lavage- and brush-based self-samples to detect cervical (pre) cancer in HPV-positive women. *Gynecol. Oncol.* 2016. doi: 10.1016/j.ygyno.2016.02.012.
12. Louvanto K, Franco E L, Ramanakumar A V, et al. Methylation of viral and host genes and severity of cervical lesions associated with human papillomavirus type 16. *Int. J. cancer* 2015; 136(6): E638-45. doi: 10.1002/ijc.29196.

13. De Strooper L M a, van Zummeren M, Steenbergen R D M, et al. CADM1, MAL and miR124-2 methylation analysis in cervical scrapes to detect cervical and endometrial cancer. *J. Clin. Pathol.* 2014; 67:1067-1071. doi: 10.1136/jclinpath-2014-202616.
14. Feng C, Dong J, Chang W, Cui M, Xu T. The Progress of Methylation Regulation in Gene Expression of Cervical Cancer. *Int. J. Genomics* 2018; 2018.
15. Del Mistro A, Frayle H, Rizzi M, et al. Methylation analysis and HPV genotyping of self-collected cervical samples from women not responding to screening invitation and review of the literature. *PLOS One* 2017; 12(3): 1-13. doi: 10.1371/journal.pone.0172226.
16. Eijsink J J H, Lendvai A, Deregowski V, et al. A four-gene methylation marker panel as triage test in high-risk human papillomavirus positive patients. *Int. J. Cancer* 2012; 130(8): 1861-1869. doi: 10.1002/ijc.26326.
17. Verlaat W, Snoek B C, Heideman D A M, et al. Identification and validation of a 3-gene methylation classifier for HPV-based cervical screening on self-samples. *Clin. Cancer Res.* 2018:clincanres.3615.2017. doi: 10.1158/1078-0432.CCR-17-3615.
18. Cuzick J, Bergeron C, von Knebel Doeberitz M, et al. New technologies and procedures for cervical cancer screening. *Vaccine* 2012; 30(SUPPL.5): F107-F116. doi: 10.1016/j.vaccine.2012.05.088.
19. El-Zein M, Bouten S, Louvanto K, et al. Validation of a new HPV self-sampling device for cervical cancer screening: The Cervical and Self-Sample In Screening (CASSIS) study. *Gynecol. Oncol.* 2018. doi: https://doi.org/10.1016/j.ygyno.2018.04.004.
20. Smith J H F. Bethesda 2001. *Cytopathology* 2002; 13(1):4-10.
21. Moran S, Arribas C, Esteller M. Validation of a DNA methylation microarray for 850,000 CpG sites of the human genome enriched in enhancer sequences. *Epigenomics* 2016; 8(3):389-399. doi: 10.2217/epi.15.114.
22. Morris T J, Butcher L M, Feber A, et al. ChAMP: 450 k Chip Analysis Methylation Pipeline. *Bioinformatics* 2014; 30(3): 428-430. doi: 10.1093/bioinformatics/btt684.
23. Luttmer R, De Strooper L M A, Berkhof J, et al. Comparing the performance of FAM19A4 methylation analysis, cytology and HPV16/18 genotyping for the detection of cervical (pre) cancer in high-risk HPV-positive women of a gynecologic outpatient population (COMETH study). *Int. J. Cancer* 2015; 138 (May 2015): 992-1002. doi: 10.1002/ijc.29824.
24. Wentzensen N, Schiffman M, Palmer T, Arbyn M. Triage of HPV positive women in cervical cancer screening. *J. Clin. Virol.* 2016; 76:S49-S55. doi: 10.1016/j.jcv.2015.11.015.
25. Marzouka, N. A., Nordlund, J., Backlin, C. L., Lonnerholm, G., Syvanen, A. C., & Carlsson Almlof, J. (2015). CopyNumber450kCancer: baseline correction for accurate copy number calling from the 450 k methylation array. *Bioinformatics.* doi: 10.1093/bioinformatics/btv652
26. Morris, T. J., Butcher, L. M., Feber, A., Teschendorff, A. E., Chakravarthy, A. R., Wojdacz T. K., & Beck, S. (2014). ChAMP: 450 k Chip Analysis Methylation Pipeline. *Bioinformatics,* 30(3), 428-430. doi: 10.1093/bioinformatics/btt684

What is claimed is:

1. A kit for predicting cervical cancer, comprising reagents and primers for DNA methylation measurements of CGIDs as set forth in SEQ ID NO:3, SEQ ID NO:31, and a combination thereof, wherein the reagents and primers are selected from:
   a) a forward, biotinylated primer consisting of the nucleotide sequence SEQ ID NO:80, a reverse primer consisting of the nucleotide sequence SEQ ID NO:81, and a pyrosequencing primer consisting of the nucleotide sequence SEQ ID NO:82, for DNA methylation measurements of the CGIDs as set forth in SEQ ID NO: 31;
   b) a forward primer consisting of the nucleotide sequence SEQ ID NO:90, and a reverse primer consisting of the nucleotide sequence SEQ ID NO:91, for DNA methylation measurements of the CGIDs as set forth in SEQ ID NO: 31;
   c) a forward primer consisting of the nucleotide sequence SEQ ID NO:83, a reverse primer consisting of the nucleotide sequence SEQ ID NO:84, and a pyrosequencing primer consisting of the nucleotide sequence SEQ ID NO:85, for DNA methylation measurements of the CGIDs as set forth in SEQ ID NO: 3;
   d) a forward primer consisting of the nucleotide sequence SEQ ID NO:88 and a reverse primer consisting of the nucleotide sequence SEQ ID NO:89, for DNA methylation measurements of the CGIDs as set forth in SEQ ID NO: 3; or
   a combination of any one of a)-d).

2. The kit of claim 1, wherein the kit is for a DNA pyrosequencing methylation assay for predicting cervical cancer.

3. The kit of claim 1, wherein the kit is for a multiplexed targeted-amplification bisulfite sequencing methylation assay for detecting cervical cancer.

4. The kit according to claim 1, wherein the kit is for a mass spectrometry based or PCR based methylation assay of DNA extracted from a sample for detecting cancer.

5. The kit of claim 1, further comprising reagents and primers for DNA methylation measurements of CGIDs as set forth in SEQ NO:4, SEQ ID NO:7, SEQ ID NO:17, SEQ ID NO:19, SEQ ID NO:34, SEQ ID NO:39, SEQ ID NO:42, SEQ ID NO:43, SEQ ID NO:49, SEQ ID NO:56, SEQ ID NO:57, SEQ ID NO:58, SEQ ID NO:65, SEQ ID NO:70 and combinations thereof.

\* \* \* \* \*

SEQUENCE LISTING

```
<160> NUMBER OF SEQ ID NOS: 91

<210> SEQ ID NO 1
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 1
gaaggaggct gcgcgccagc ccgcccgcgg cgcccgggct caggcgccgt gacggctgca        60
cgcgctgccc cgcactctga gggccttcat tagctcgctc cccgcgccga ggctggggcg       120
gg                                                                     122

<210> SEQ ID NO 2
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 2
cctcccgcag ctcattgcag ccccgaggaa atcaccgggg gagggctcgg gagtgcggcg        60
cggcagcccc ataatttcca gggcccttct cctacactga cacgtaattg tcagattgtt       120
tt                                                                     122

<210> SEQ ID NO 3
<211> LENGTH: 122
```

```
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 3
ccgccgcggg ttcccagggc tggtggtagt tgccgtccca cacgtacgtg gcggggtcct    60
cgtcagcgaa gacctcgcgg aacatgtcga ccatgtagag gtcctcggcg cggttgccat   120
cc                                                                  122

<210> SEQ ID NO 4
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 4
ggggaggaat attagactcg gaggagtctg cgcgcttttc tcctcccgc gcctccggt     60 cgccgcgggt tcaccgctca gtccccgcgc tcgctccgca ccccacccac ttcctgtgct   120
cg                                                                  122

<210> SEQ ID NO 5
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 5
caggccggtc ccagccgccc ggagccccag tgcgcgatgg cggccggcaa actgcgcctg    60
cgcactgggc ctcaccgcgg actacgactc ccacaatgcc gcgaggctgt gccgcgcacc   120
gg                                                                  122

<210> SEQ ID NO 6
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 6
gtgacgcgcg gccgcagctg cccgcgggcg gagcgctctc agaccccgga gcgcacaccg    60
cggggccatc ggtgccatcg cggatctcca ggctcctcat cagtccgccg gggccgcagc   120
ag                                                                  122

<210> SEQ ID NO 7
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 7
gaggaatatt agactcggag gagtctgcgc gcttttctcc tccccgcgcc tccggtcgc     60 cgcgggttca ccgctcagtc cccgcgctcg ctccgcaccc cacccacttc ctgtgctcgc   120
```

-continued

```
cc                                                                  122

<210> SEQ ID NO 8
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 8
atctaccgtc tccaatctcc atctccgaag ttatgcccac ttcctcgaag tttggagcca      60
cgcgaactac actgcccaga aggcgccgcg ccgtgagccg cgatgcttgg ccaatgaaaa     120
ga                                                                   122

<210> SEQ ID NO 9
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 9
gggagggctc gtgagagcca atgagagcgc ggaaggcggc gagcgagcca atggacgcgg      60
cggtggggca gggggcgggg cctgggcgag gccgggggcg gaatgggctg agtgccctgt     120
ct                                                                   122

<210> SEQ ID NO 10
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 10
cggcaagcgg agcagcgagg cagggtagct tcatcacact cgcggcggat gcggattccg      60
cgccgccccg gctctagctg ctcaggcgac cgccaccctc gcctcgccgc cgcccgtgca     120
ca                                                                   122

<210> SEQ ID NO 11
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 11
gcggacggcg gctccatccg cggcaatcac cgtagtgctt gtttgtggaa gccgagcgtg      60
cgtgcgccgc gcgcgcaccc agtccagcgc ggagtgggcg tctacccgag gaggggtgtc     120
tg                                                                   122

<210> SEQ ID NO 12
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide
```

<400> SEQUENCE: 12
tggggaatta gctcaggcgg tggagcgctc gcttagctat gcgagaggta gcgagatcga      60
cgcccgcatt ctccagtttc ttgtctggtt tatgtctctt agtttgtatt ccccgttgtt     120
tc                                                                   122

<210> SEQ ID NO 13
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 13
gaagtcccag ggacctgcgg agcgcagaca taacacaaca cagagcaaaa ctcaccgctg      60
cggtgacttt cactccacgc gatccgcttc ccggtttacg ctaaactggg cgctcgggac     120
ag                                                                   122

<210> SEQ ID NO 14
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 14
ggctgcggac ggcggctcca tccgcggcaa tcaccgtagt gcttgtttgt ggaagccgag      60
cgtgcgtgcg ccgcgcgcgc acccagtcca gcgcggagtg ggcgtctacc gaggaggg      120 tg                                                                   122

<210> SEQ ID NO 15
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 15 ccccgccgg ccgccggccg cgctccccgc cttcattctg tgatctgcgg atttgccagt      60
cgccaacctc gcgcccaga gtcaccatcg cgcagggttg ggcaaaccat ggagctcggg     120
gc                                                                   122

<210> SEQ ID NO 16
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 16
aactcctgca caaatcattt caaacgcggt cggcttctaa tcgggaagta atctcagtga      60
cgctggcggt gcagagaacc gagtctggac gcacacacac aaacacaccg cgggcctccg     120
ca                                                                   122

<210> SEQ ID NO 17

-continued

<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 17
gtgtgctcag cctcagcgtg aggggcacct gctcgtctgg gctcacagcg aaggcagcct    60
cgccgcgagc tgccgctgcc gctgctgccg ccactggtgt tgccgctctc aggcgccagg   120
ct                                                                  122

<210> SEQ ID NO 18
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 18
gccgggagcc tgacgtcacc acgccctgcc tgtcaatctg cagcgcgcgc cgctcgcagc    60
cgccttttct gccaccaact gtatctctca ctcgcggagc cggcacagcg acaggcgccc   120
cg                                                                  122

<210> SEQ ID NO 19
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 19
gcggcggcgg gcggggagcc aggcccgagc tgcgttctgc gcagccattg gtgggcgccg    60
cgctctgcac tgagcatgtt cgcgccccgc cggcccctag ccgcagccgc agccgcagcg   120
ac                                                                  122

<210> SEQ ID NO 20
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 20
caaccggttc cgccgcgttt gtgggctggt agcccggaat acatttccca gaggccttcg    60
cggccgacgt gcttcgcgca ggaacgcagc cgcctcccga ctggaggacg cggtagcgga   120
gc                                                                  122

<210> SEQ ID NO 21
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 21
gctgcccgtg gtcaaactgg agtcgctgaa gcgctggaac gaagagcggg gcctctggtg    60
cgagaagggg gtgcaggtgc tgctgacgac ggtgggcgcc ttcgccgcct tcggcctcat    120
ga                                                                    122

<210> SEQ ID NO 22
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 22
cttcccggct ccccgcggtg cgcacccgct ggccactctg cgcacgcgcg ccgggtgccc    60
cggcctaagg ccgttgacct cgggttctcc ccggcacagt cgaatccacg ccagggccct    120
ca                                                                    122

<210> SEQ ID NO 23
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 23 gcggggagg ttgcggggga ggctcggcgt ccccgctctc cgccccgcga caccgactgc     60
cgccgtggcc gccctcaaag ctcatggttg tgccgccgcc gccctcctgc cggcccggct    120
gg                                                                    122

<210> SEQ ID NO 24
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 24
tgtactactt cctctgccac ctggccttgg tagacgcggg cttcactact agcgtggtgc    60
cgccgctgct ggccaacctg cgcggaccag cgctctggct gccgcgcagc cactgcacgg    120
cc                                                                    122

<210> SEQ ID NO 25
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 25
aaaaaaaaaa aaaagcaatg agccgcaagc cttggactcg cagagctgcc ggtgcccgtc    60
cgagagcccc accagcgcgg ctcacgcctc agtctcgccg ccccaaggtg ggatccgacg    120
cc                                                                    122

<210> SEQ ID NO 26
<211> LENGTH: 122
<212> TYPE: DNA
<213> ORGANISM: Artificial Sequence
<220> FEATURE:
<223> OTHER INFORMATION: Description of Artificial Sequence: Synthetic

```
                              polynucleotide

<400> SEQUENCE: 26
cgagagggcc cggtccagca gcctctgggg cccagtgcgc agggcactgc gggccgattg    60
cgccccgggg ccaggaggcg ccgagaaagc aaaagcaaaa gccggcggcg ggtggaggtc   120
aa                                                                  122

<210> SEQ ID NO 27
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 27
cggccgcagt gtgccgcccg ctgcgctatg cggggctcgt ctccccgcgc ctatgtcgca    60
cgctggccag cgcctcctgg ctaagcggcc tcaccaactc ggttgcgcaa accgcgctcc   120
tg                                                                  122

<210> SEQ ID NO 28
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 28
cctggcgcga ccgccagcag cacccagcgc ggggccggga gctgctgggg gcccaggctc    60
cgctctcccc accgctctgc accgctgccg gctgcggaca gacccgatgc gccaccacca   120
cc                                                                  122

<210> SEQ ID NO 29
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 29
ccggagcgcg ctgctgccct ctaccggtca tccgtgcggc cggacaccgt gtcaggcccg    60
cgaggagggc tctgccgcag tcccggggaa cagcacccag cagcgccact gggagaggaa   120
ac                                                                  122

<210> SEQ ID NO 30
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 30
agtccagagc ggcgctgtgc agctggaagg gcgcgcgata gctcaagtta gaggcggccc    60
cggggcgcgg cgcaggacac aagacctcaa actggtactt gcacaggtag ccgttggcgc   120
gc                                                                  122
```

```
<210> SEQ ID NO 31
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 31
ggcggtgcga gctccccgcc tgcgggacgc acggagaccg cggtcagcgc gccgcctggc    60
cggcccagcg cgcccagccc gcgcccagcc ccgtccactc ccgtccagcc ccgccgcccg   120
gc                                                                  122

<210> SEQ ID NO 32
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 32
cggtagagtt ccaacacga aagcccgtgt ggtcgcgccg ggagctcacg gcgttccaag    60
cggcacttat cccgcgttga tgcccaggca ccccgcgcgc cctgtttcac caggcccagt   120
ca                                                                  122

<210> SEQ ID NO 33
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 33
ccagcggcag tagctgtagc agcttcagcg aagccggaga tgggcagaga gcgcgcgcgg    60
cgcagcagct ccagattcac tgctctcccc tgcagctccc cgcgccccg ccgctgtcgc   120 tg                                                                  122

<210> SEQ ID NO 34
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 34
gtgttctctg cggcgggccg cgtccccgct gagcctcgcg gtgacagccg cctttggcag    60
cgagcgctcg gggcacttct atccccgcct ctcaaagggt ggggacagcc gtttccagat   120
tt                                                                  122

<210> SEQ ID NO 35
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 35
cggccgcgcc cccggcagcc cagggcgcgc ttccaccacg gtaccggtgg attcgccgtg    60
```
cgcagccgga agatggcgca gacgcacaaa gcacaccgat gctgcgccat gatagggccg    120
gc                                                                   122

<210> SEQ ID NO 36
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 36
tctcgcggcg caggcggcgg cggcagaggt ggggtcgcgc agcggaggca gctcgagctt    60
cgggatgcgc gctcgcttct tgggctcctc gctcgatctt actgccccct tttttctctc   120
cc                                                                   122

<210> SEQ ID NO 37
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 37
tcctccagcc agagtcggtg ggactggctg cgctgccctg aagtggttct ccaagcagcg    60
cggagggtgg cggacggcgg acggagccca ggggccgcgt cgggtgggga aacccgaact   120
cg                                                                   122

<210> SEQ ID NO 38
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 38
tgcgcatcgc tggctctggg ttccgccgaa tgcgtcctcc tggcggtgat ggctctggac    60
cgcgcggccg cagtgtgccg cccgctgcgc tatgcggggc tcgtctcccc gcgcctatgt   120
cg                                                                   122

<210> SEQ ID NO 39
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 39
aggggagctg cgaggcgaag tgttcttcag ggaagcgggc tcgagtctcc gcagctgcgg    60
cggcggcggc ggcgcgctgg gccggcggcg ggcgcgggca gggggccggg ggtgccgcgc   120
gg                                                                   122

<210> SEQ ID NO 40
<211> LENGTH: 122
<212> TYPE: DNA
<213> ORGANISM: Artificial Sequence
<220> FEATURE:

```
<223> OTHER INFORMATION: Description of Artificial Sequence: Synthetic
      polynucleotide

<400> SEQUENCE: 40
cctccacccc cggggggttc ctgcgcactg aaagaccgtt ctccggcagg ttttgggatc    60
cggcgacggc tgaccgcgcg ccgccccac gcccggttcc acgatgctgc aatacagaaa   120
gt                                                                 122

<210> SEQ ID NO 41
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 41
agagaggggt cccagaacga aggtggcggc acgagctctg cgctggcggc tgtgggggggc    60 cggcgctcag gaccccaact ccatccaagt tgcgccgcgg tggggcgggg cggaggcggc   120
gc                                                                 122

<210> SEQ ID NO 42
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 42
aatctcccct cgggctcgac ggatgtgcgc cccagatgtg ctgacacatg tccgatgcct    60
cgctgccttg gaggtctccc cgctcgcgtg tctcttctct tcgcaccagc ggcggaaacc   120
gc                                                                 122

<210> SEQ ID NO 43
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 43
gctccgcttc tccgggtttt agcggaagcc tgcgggggc ggggtaaccg cggaagccgg    60
cggccgtggg cgcgcgggtt gggggctctc gcgccgctcc gggctctccc ccccccggc   120 tg                                                                 122

<210> SEQ ID NO 44
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 44
cgcgctccgc ttctccgggt tttagcggaa gcctgcgggg ggcggggtaa ccgcggaagc    60
cggcggccgt gggcgcgcgg gttgggggct ctcgcgccgc tccgggctct cccccccccc   120
gg                                                                 122
```

<210> SEQ ID NO 45
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 45
gcgagggatc tctgtgcgtc ctcactggcc catgcaccca gcacctgcga ctcccgccgt    60
cgggctgcgt ggccccgcgc ccacacctgc ccgtcccttc cgtcgtccct cgctcgcgca   120
ga                                                                  122

<210> SEQ ID NO 46
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 46
ggggaggtgt ggggagcgga aggccgcagg agcatctttg cggagaaagt actttggctg    60
cggcgggcgc agggcgggcc ggctagcccc gcgccccacc tgttctgtgc gtcgcgctcg   120
cc                                                                  122

<210> SEQ ID NO 47
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 47
tagggctgga aacccgccgc cacagcgggc tagaggtcgt ccccgcccgc aacatatgcg    60
cgaaggaaag tgctacgaac gtcaaatggc cgccccccgc cgacgccatc tgctctgcga   120
ag                                                                  122

<210> SEQ ID NO 48
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 48
cgcccgcaac atatgcgcga aggaaagtgc tacgaacgtc aaatggccgc ccccgccga    60 cgccatctgc tctgcgaagc agaaacggcg gcagctgcgc gcccagtccc tccgcccgcg   120
cc                                                                  122

<210> SEQ ID NO 49
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 49
ccccctgttc aaggtctgtc accgtagggg gcggggggc gcgtggagcc gctgggggtt    60
cggcccaccc cgcgaaccga gctcccggcc ctgtgcgccc tcagctctgc cgcgggcgtt   120
gg                                                                 122

<210> SEQ ID NO 50
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 50
gctgtggccg cagctgaggc ccgacgagct tccggccggg tctttgccct tcactggccg    60
cgtgaacatc acggtgcgct gcacggtggc cacctctcga ctgctgctgc atagcctctt   120
cc                                                                 122

<210> SEQ ID NO 51
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 51
gtgtgcgtgt gcgtgtgctc agcctcagcg tgagggcac ctgctcgtct gggctcacag    60
cgaaggcagc ctcgccgcga gctgccgctg ccgctgctgc cgccactggt gttgccgctc   120
tc                                                                 122

<210> SEQ ID NO 52
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 52
tggggcagcg gcgttgcagg agatgagctc agcgcaaagg gaaccccgca gcggcgagtg    60
cggctgctgg cctgcgcgct gtggccccaa caggctggca gggcgcgggc gggtggcggg   120
gt                                                                 122

<210> SEQ ID NO 53
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 53
agagtcggtg ggactggctg cgctgccctg aagtggttct ccaagcagcg cggagggtgg    60
cggacggcgg acggagccca ggggccgcgt cgggtgggga aacccgaact cgcggagggg   120
aa                                                                 122

<210> SEQ ID NO 54
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 54
aaagccctgg caggtaaaga gaggacccgc gcaggctggg agctcccact cctcctccag    60
cgtcacgctc gccctccgcc gctgcctcgc gtccgggtct gtttatatag cgtctggagg   120
cc                                                                  122

<210> SEQ ID NO 55
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 55
ctggccaagt gccggcccat cgcggtgcgc agcggagacg ccttccacga gatccggccg    60
cgcgccgagg tggccaacct cagcgcgcac agcgccagcc ccatccagga tgcggtcctg   120
aa                                                                  122

<210> SEQ ID NO 56
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 56
ggcgccggca gcttcgcgcc ggcggctgga agcgggcggg ctgcacgggc ggctcgagtg    60
cggggacccc agcccctcgc cctcgtgagc gccgcccctg ccacctgctg ccaagtcacc   120
gg                                                                  122

<210> SEQ ID NO 57
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 57
ccccggccgc gccgggcgcg gggctcggga ttcgggagac cgcgcggcgc cgaagccacg    60
cgtcagcccc actgtcccgc gcgcctcgcc ccaggcctcg ggctcttcct ccgcacctcg   120
ta                                                                  122

<210> SEQ ID NO 58
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 58
acgcggggac tggaaagggc gcctgggtgg gaagaggcgc tggcgggtga tcgtccccac    60
cgggccagtc cccgggatct gctgccgccc ctctccgaaa ttcacagcca gagcgggcgc   120
ac                                                                  122

<210> SEQ ID NO 59
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 59

```
tctgagaagt gtcctcctcg ctctcttata aaaacaggac ttgttgccga ggtcagcgcg      60
cgcatcgagt gtgccaggcg tgtgcgtggt ttctgctgtg tcattgcttt cacggaaggt     120
gg                                                                    122
```

<210> SEQ ID NO 60
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 60

```
gcgcccagac tgcgcgccgc gccgctgcgc ccaacattcc cgaggacggc ttcgcgggcg      60
cgtatcgtcc agaccggagc accgcccccac cgctagcgca ggagacctgc cggggaagtc    120
gc                                                                    122
```

<210> SEQ ID NO 61
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 61

```
aaaggccgta ctctgcccccc cgcgggaccc aggtccccgc ctgctgcaga gcgcactctg     60
cgcacgtcga gccgcgaaag gttcacagaa gaaaacaaga gaaagaagta gcaggcactg    120
ag                                                                    122
```

<210> SEQ ID NO 62
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 62

```
ggaatccatt cttttaagcc agggtttaaa actcttcaag caagtcatct gcaaaggtac      60
cgcttctacc attttaaaga taggattatg ttccctagga caactggatg agccctagga    120
ac                                                                    122
```

<210> SEQ ID NO 63
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 63

```
gaggagcgcg ccgctgcctc tggcgggctt tcggcttgag gggcaaggtg aagagcgcac    60
cggccgtggg gtttaccgag ctggatttgt atgttgcacc atgccttctt ggatcggggc   120
tg                                                                  122
```

<210> SEQ ID NO 64
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 64

```
ccctgtgcgt gccgccgcgc tgttgctcgc agtgtgctgg cgccgagctc ggtggacacg    60
cgcgcagtca gagctgcctc tcgccctcgc tagctgggct cgcagcctct tcctccctcc   120
ct                                                                  122
```

<210> SEQ ID NO 65
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 65

```
ctctttggca agtggtttgt gcatcaggag aaactttcca cctgcgagcc gaaccggcgc    60
cgagtgcgtg tgtttctgcc ttttttttgtt gtcgttgcct ccaccccctcc ccattcttct  120 ct                                                                  122
```

<210> SEQ ID NO 66
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 66

```
tggctgccag agcgagtgag gggcgcagag gcggcagaga gcggagagcc ccggtgtctc    60
cgcgagggcg gcggcggcca gcagacggcg atcgaggcgc gcgccacggc acggccagcg   120
ca                                                                  122
```

<210> SEQ ID NO 67
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 67

```
aagcgcgtgg agagccgaaa ggtgcggtgg gcgcagaggg cgggctggct gcggggcgac    60
cgcgcgccgg ggccatgccg cgctccttcc tggtggactc gctagtgctg cgcgaggcgg   120
gc                                                                  122
```

<210> SEQ ID NO 68
<211> LENGTH: 122
<212> TYPE: DNA

<213> ORGANISM: Artificial Sequence
<220> FEATURE:
<223> OTHER INFORMATION: Description of Artificial Sequence: Synthetic
      polynucleotide

<400> SEQUENCE: 68
ggggtcgcca tgaccgagtg gcccaggccc gagcgaagcc cgcgcgcggt gagtccgccg     60
cggcccatcc gtccctccgc ccgccagagc gtccatcggg acgcccaccc gggagggtct    120
cg                                                                   122

<210> SEQ ID NO 69
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 69
ccgagcgctg cccccgccgg cccgcggctg ccagccggcc ctgcccgcgc ccgggccccg     60
cgagcggccg cacttcacct tacggagggg agataatgag atcaattaga ggcgccgtca    120
cc                                                                   122

<210> SEQ ID NO 70
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 70
ggcaaccctg actcggaccg ctcgggagag ccccaggaga ggccagcgcc gcgcagcagc     60
cgccccgctg cgcccacctc cccggctgct cccggagggc tcacaaaggc ggtggccgcc    120
cg                                                                   122

<210> SEQ ID NO 71
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 71
gcgggcggca gccgcaagcg aggaatccag cgcagggaaa gtagcccag tggggcccgg     60 cgcgtcagcc ccactcgcgt ggcaaaactt gcggggggcccc ccgcgtgccg cgcctcagcc   120
ca                                                                   122

<210> SEQ ID NO 72
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 72
tcctcgccgt cggggtcctc ctcctctgcc gacgagttgt cactgggcga ggcgtagctg     60
cgctctacgc cgcggagggg cggcctcttg gaggcgggga ccgggtactc ccgctgcagc    120
cc 122

<210> SEQ ID NO 73
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 73
gctgctcgcg ctccgccgcc cgggagatgc ttcctcgcgc ggcgcagcgc tgaggccgtg    60
cgtgcgcccc ggctgcgctg cgcgctcccc acatacacaa gctctccatg tgagctgaca   120
gg                                                                  122

<210> SEQ ID NO 74
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 74
cttctcttga aaaggaggag aatcaacact gggctcacaa ctcatcagag ctgagtcata    60
cgtacatcag caggacctac gtgggaacca aatagcaaac tcaaatttggg aaatttgagg   120 aa                                                                  122

<210> SEQ ID NO 75
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 75
ccgagagccc cgcctgcagg cggtgtagat acatgtagat actgtagata ctgtagatac    60
cgccccggcg ccgacttgat aaacggtttc gcctcttttg aagccgcct gcgtgtccat    120 tt                                                                  122

<210> SEQ ID NO 76
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 76
tgaggagtga ggaggcagaa aggaccgaga acaaggggac ccggttccat ttctggaccc    60
cgtccgcagg ctgctcgccc gacttggggt cgctctgccc cggacgatca ggacagctgc   120
gt                                                                  122

<210> SEQ ID NO 77
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide -continued

```
<400> SEQUENCE: 77
caaatctata tgaaggatcg aattgcattg aactagcaaa cacacacaca cacacgcaca      60
cgcaaaaact gatgaaagct gaacaaggtc tgtagtctag tcaacagtac tgcactatgt     120
ga                                                                    122

<210> SEQ ID NO 78
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 78
acagtctctc gcctcaaaga tctccgccat tagtggtagc catttaagaa aacagaatta      60
cgatgaataa tgatttgaag ccaaaaagtc aaaatatctt atttcgcaac tgtaattgct     120
gg                                                                    122

<210> SEQ ID NO 79
<211> LENGTH: 122
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 79
ccacacaggc ctctccctcg gtgcggtagc gagggttgcg ggcccaaacg cccgcgccca      60
cggaggcgcc tgcgacgact agaagcttcc acagccatat gggggcaaag acggcccagt    120
ag                                                                    122

<210> SEQ ID NO 80
<211> LENGTH: 25
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 80
ggttttnggg taggaaggat agtag                                            25

<210> SEQ ID NO 81
<211> LENGTH: 25
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 81
aaacaaatct aacccctaaa aaaac                                            25

<210> SEQ ID NO 82
<211> LENGTH: 20
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 82
```
caaactaaac acactaaacc                                                    20

<210> SEQ ID NO 83
<211> LENGTH: 21
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 83
gggtttttag ggttggtggt a                                                  21

<210> SEQ ID NO 84
<211> LENGTH: 24
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 84
tcctcataat aataaataac aacc                                               24

<210> SEQ ID NO 85
<211> LENGTH: 18
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 85
tatgtatgtg gtggggtt                                                      18

<210> SEQ ID NO 86
<211> LENGTH: 45
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 86
aatgatacgg cgaccaccga gatctacact ctttccctac acgac                        45

<210> SEQ ID NO 87
<211> LENGTH: 52
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:
<221> NAME/KEY: AGTCATCG
<222> LOCATION: (25)..(32)

<400> SEQUENCE: 87
caagcagaag acggcatacg agatagtcat cggtgactgg agttcagacg tg                52

<210> SEQ ID NO 88
<211> LENGTH: 59
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:

```
<221> NAME/KEY: misc_feature
<222> LOCATION: (34)..(38)
<223> OTHER INFORMATION: n is a, c, g, or t

<400> SEQUENCE: 88
acactctttc cctacacgac gctcttccga tctnnnnngg gtttttaggg ttggtggta        59

<210> SEQ ID NO 89
<211> LENGTH: 58
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 89
gtgactggag ttcagacgtg tgctcttccg atcttcctca taataataaa taacaacc        58

<210> SEQ ID NO 90
<211> LENGTH: 67
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:
<221> NAME/KEY: misc_feature
<222> LOCATION: (34)..(38)
<223> OTHER INFORMATION: n is a, c, g, or t

<400> SEQUENCE: 90
acactctttc cctacacgac gctcttccga tctnnnnngg taggttttg ggtaggaagg        60 atagtag                                                                67

<210> SEQ ID NO 91
<211> LENGTH: 59
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 91
gtgactggag ttcagacgtg tgctcttccg atctaaacaa atctaacccc taaaaaaac       59
```